US010421111B2

United States Patent
Gorsuch et al.

(10) Patent No.: US 10,421,111 B2
(45) Date of Patent: Sep. 24, 2019

(54) METHOD AND APPARATUS FOR CONTROLLING AN OPERATION PERFORMED ON A CONTINUOUS SHEET OF MATERIAL

(71) Applicant: Ball Corporation, Broomfield, CO (US)

(72) Inventors: Jason E. Gorsuch, Golden, CO (US); Kenneth D. Anderson, Bristol, VA (US); Alex V. Crisman, Arvada, CO (US); Thomas J. Stokes, Arvada, CO (US); Bradley Roy Begeman, Fort Lupton, CO (US)

(73) Assignee: BALL CORPORATION, Broomfield, CO (US)

(*) Notice: Subject to any disclaimer, the term of this patent is extended or adjusted under 35 U.S.C. 154(b) by 0 days.

(21) Appl. No.: 16/126,936

(22) Filed: Sep. 10, 2018

(65) Prior Publication Data

US 2019/0018396 A1    Jan. 17, 2019

Related U.S. Application Data

(63) Continuation-in-part of application No. 15/130,319, filed on Apr. 15, 2016, now Pat. No. 10,073,443.
(Continued)

(51) Int. Cl.
*G06F 19/00* (2018.01)
*B21D 22/00* (2006.01)
(Continued)

(52) U.S. Cl.
CPC ............. *B21D 22/00* (2013.01); *B21D 47/00* (2013.01); *G05B 19/41865* (2013.01);
(Continued)

(58) Field of Classification Search
CPC ...... G01B 3/1002; B65H 26/02; B65B 41/16; B42F 21/00; B21D 51/383; B21D 22/00;
(Continued)

(56) References Cited

U.S. PATENT DOCUMENTS

| 3,086,889 A | 4/1963 | Strong |
| 3,230,925 A | 1/1966 | Blanz |

(Continued)

FOREIGN PATENT DOCUMENTS

| EP | 1590108 | 6/2011 |
| GB | 2428659 | 11/2007 |

(Continued)

OTHER PUBLICATIONS

"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].
(Continued)

*Primary Examiner* — Tuan A Vu
(74) *Attorney, Agent, or Firm* — Sheridan Ross PC

(57) ABSTRACT

A system and method of performing an operation on a continuous sheet of stock material is provided. More specifically, the present invention relates to a system and method used to perform an operation on a continuous sheet of stock material in a high speed manufacturing system. The continuous sheet of stock material can subsequently be received by a second system that performs a different operation on the continuous sheet of stock material. In one embodiment, the second system forms the continuous sheet of stock material into tabs for container end closures. The system can include an infeed accumulation device and an outfeed accumulation device. The infeed and outfeed accumulation devices enable the system to operate at a variable rate and out of phase with a high speed, coil fed manufac-
(Continued)

turing system to which the system may be removably integrated. The system can determine if the operation has been performed in at a predetermined location of a portion of the continuous sheet of stock material.

20 Claims, 10 Drawing Sheets

Related U.S. Application Data

(60) Provisional application No. 62/149,079, filed on Apr. 17, 2015.

(51) Int. Cl.
*G05B 19/418* (2006.01)
*B21D 47/00* (2006.01)

(52) U.S. Cl.
CPC . *G05B 2219/31376* (2013.01); *Y10S 220/906* (2013.01); *Y10T 29/49787* (2015.01)

(58) Field of Classification Search
CPC ............... B21D 47/00; Y10T 29/49787; Y10S 220/906; G05B 19/41865
See application file for complete search history.

(56) References Cited

U.S. PATENT DOCUMENTS

| | | | |
|---|---|---|---|
| 3,286,302 A | 11/1966 | Doering | |
| 3,818,335 A | 6/1974 | Stungis et al. | |
| 4,024,545 A | 5/1977 | Dowling et al. | |
| 4,203,240 A | 5/1980 | Goodwin | |
| 4,304,981 A | 12/1981 | Gappa | |
| 4,393,411 A | 7/1983 | Amtower | |
| 4,467,207 A | 8/1984 | Lerner et al. | |
| 4,485,935 A | 12/1984 | Stoffel | |
| 4,568,230 A * | 2/1986 | Brown | B21D 51/383 413/14 |
| 4,635,545 A | 1/1987 | Kubacki et al. | |
| 4,922,077 A | 5/1990 | Gordon | |
| 4,965,829 A | 10/1990 | Lemelson | |
| 5,125,780 A | 6/1992 | Budenbender | |
| 5,170,279 A | 12/1992 | Schwartz et al. | |
| 5,202,199 A | 4/1993 | Mitzutani et al. | |
| 5,215,864 A | 6/1993 | Laakmann | |
| 5,235,454 A | 8/1993 | Iwasaki | |
| 5,315,108 A | 5/1994 | Gross | |
| 5,331,443 A | 7/1994 | Stanisci | |
| RE34,837 E | 1/1995 | Iwanami et al. | |
| 5,401,979 A | 3/1995 | Kooijman et al. | |
| 5,555,992 A | 9/1996 | Sedgeley | |
| 5,653,900 A | 8/1997 | Clement et al. | |
| 5,719,372 A | 2/1998 | Togari et al. | |
| 5,751,436 A | 5/1998 | Kwon et al. | |
| 5,837,962 A | 11/1998 | Overbeck | |
| 5,864,788 A | 1/1999 | Kutsumi | |
| 6,021,266 A | 2/2000 | Kay | |
| 6,062,556 A | 5/2000 | McCay | |
| 6,080,958 A | 6/2000 | Miller et al. | |
| 6,105,806 A | 8/2000 | Stasiuk | |
| 6,314,562 B1 | 11/2001 | Biggerstaff | |
| 6,433,302 B1 | 8/2002 | Miller et al. | |
| 6,460,723 B2 | 10/2002 | Nguyen et al. | |
| 6,498,318 B1 * | 12/2002 | Miller | B21D 51/383 219/121.69 |
| 6,533,518 B1 * | 3/2003 | Turner | B21D 51/383 413/12 |
| 6,706,995 B2 | 3/2004 | Miller et al. | |
| 6,745,384 B1 | 6/2004 | Biggerstaff | |
| 6,808,351 B1 | 10/2004 | Brown et al. | |
| 7,638,252 B2 | 12/2009 | Stasiak et al. | |
| 7,972,426 B2 | 7/2011 | Hinch et al. | |
| 8,146,768 B2 | 4/2012 | Forrest et al. | |
| 8,720,077 B1 * | 5/2014 | Fallisgaard | G01B 3/1002 33/759 |
| 8,844,747 B2 | 9/2014 | Petti | |
| 9,007,413 B2 | 4/2015 | Boisvert et al. | |
| 9,186,924 B2 | 11/2015 | Lewis | |
| 9,278,776 B2 | 3/2016 | Ramsey et al. | |
| 1,007,344 A1 | 9/2018 | Gorsuch et al. | |
| 2002/0075504 A1 * | 6/2002 | Fernandez | B42F 21/00 358/1.15 |
| 2003/0015507 A1 | 1/2003 | Miller et al. | |
| 2005/0045637 A1 | 3/2005 | Rohr et al. | |
| 2005/0190367 A1 * | 9/2005 | Colvill | B65H 26/02 356/429 |
| 2006/0117980 A1 | 6/2006 | Cesak et al. | |
| 2008/0011772 A1 | 1/2008 | Morris et al. | |
| 2008/0302153 A1 | 12/2008 | Kondo et al. | |
| 2009/0008859 A1 | 1/2009 | Fairweather et al. | |
| 2009/0179375 A1 | 7/2009 | Tamura et al. | |
| 2010/0024364 A1 * | 2/2010 | Schagidow | B65B 41/16 53/463 |
| 2010/0088665 A1 | 4/2010 | Langworthy et al. | |
| 2010/0131936 A1 | 5/2010 | Cheriton | |
| 2011/0084051 A1 | 4/2011 | Reed et al. | |
| 2011/0115815 A1 | 5/2011 | Xu et al. | |
| 2013/0075401 A1 | 3/2013 | Forrest | |
| 2013/0224379 A1 | 8/2013 | Kitamura et al. | |
| 2014/0084003 A1 | 3/2014 | Ramsey et al. | |
| 2014/0271043 A1 | 9/2014 | Butcher et al. | |
| 2014/0271044 A1 | 9/2014 | Butcher et al. | |
| 2014/0291322 A1 | 10/2014 | Ramsey et al. | |
| 2015/0020205 A1 | 1/2015 | Wang et al. | |
| 2015/0027327 A1 | 1/2015 | Ellefson | |
| 2015/0158627 A1 | 6/2015 | Ramsey et al. | |
| 2015/0174638 A1 | 6/2015 | Anguera et al. | |
| 2015/0209854 A1 | 7/2015 | Selepack | |
| 2015/0375943 A1 | 12/2015 | Ellefson et al. | |
| 2016/0016687 A1 | 1/2016 | Ramsey et al. | |
| 2016/0034805 A1 | 2/2016 | Ramsey | |
| 2016/0046033 A1 | 2/2016 | Zuech et al. | |
| 2016/0114501 A1 | 4/2016 | Carson et al. | |
| 2016/0221065 A1 | 8/2016 | Butcher et al. | |
| 2016/0332772 A1 | 11/2016 | Ramsey | |
| 2016/0350090 A1 | 12/2016 | Kawaguchi | |

FOREIGN PATENT DOCUMENTS

| | | |
|---|---|---|
| GB | 2428668 | 7/2008 |
| JP | S63-252746 | 10/1988 |
| JP | H08-175006 | 7/1996 |
| JP | 2011-006093 | 1/2011 |
| JP | 2011-011760 | 1/2011 |
| JP | 2011-016545 | 1/2011 |
| JP | 2011-20701 | 2/2011 |
| SU | 791207 | 12/1980 |
| WO | WO 01/68460 | 9/2001 |
| WO | WO 2007/007102 | 1/2007 |
| WO | WO 2009/069517 | 6/2009 |
| WO | WO 2011/053776 | 5/2011 |
| WO | WO 2013/049313 | 4/2013 |
| WO | WO 2013/049320 | 4/2013 |
| WO | WO 2013/155423 | 10/2013 |
| WO | WO 2013/158771 | 10/2013 |
| WO | WO 2014/028360 | 2/2014 |
| WO | WO 2014/072455 | 5/2014 |
| WO | WO 2014/150647 | 9/2014 |
| WO | WO 2014/152858 | 9/2014 |

OTHER PUBLICATIONS

"Videojet© Allprint LN100A ND: YAG Laser Marking System," Videojet Technologies Inc., © 2010, 2 pages.
International Search Report and Written Opinion for International (PCT) Patent Application No. PCT/US2016/027805, dated Aug. 25, 2016 14 pages.
Official Action for Australia Patent Application No. 2016249245, dated May 2, 2018 3 pages.

(56) References Cited

OTHER PUBLICATIONS

Official Action for Canada Patent Application No. 2,982,977, dated Jun. 18, 2018 4 pages.
Notice of Allowance for U.S. Appl. No. 15/130,319, dated May 1, 2018, 18 pages.
Notice of Acceptance for Australia Patent Application No. 2016249245, dated Oct. 3, 2018 3 pages.
Decision to Grant and Search Report for Russia Patent Application No. 2017139817/13, dated Aug. 28, 2018 11 pages.
Extended Search Report for European Patent Application No. 16780860.9, dated Dec. 13, 2018 9 pages.

* cited by examiner

METHOD AND APPARATUS FOR CONTROLLING AN OPERATION PERFORMED ON A CONTINUOUS SHEET OF MATERIAL

CROSS-REFERENCE TO RELATED APPLICATIONS

This application is a Continuation-in-Part application of, and claims priority to, U.S. patent application Ser. No. 15/130,319, filed on Apr. 15, 2016, entitled "Method and Apparatus for Controlling the Speed of a Continuous Sheet of Material," now U.S. Pat. No. 10,073,443, which claims priority under 35 U.S.C. § 119(e) to U.S. Provisional Patent Application Ser. No. 62/149,079 filed Apr. 17, 2015, which is incorporated herein in its entirety by reference.

FIELD OF THE INVENTION

The present invention relates generally to the manufacture of container end closures. More specifically, the present invention relates to a system and method of controlling the speed of a continuous sheet of material, and more specifically, of tab stock. The system can operate out of phase with a high speed, coil fed end closure manufacturing system to which the tab manufacturing and marking system is removably integrated.

BACKGROUND

As part of container manufacturing, or in some cases during filling or sealing operations of containers, markings may be placed on a number of container locations including the end closure. The markings may serve a variety of purposes, including decorating the container, identifying contents, identifying the location or date of manufacture or use, identifying the maker of the container or container component, the style or materials for the container, providing trade names, advertising, promotion, or the like. In some situations, promotional information such as sweepstakes, contests, or some other indicia are placed or marked on containers or container components.

A variety of devices and procedures have been used for marking containers and container components, such as pull tabs. Currently the container body is the primary surface of a container that is marked. However, container bodies and the markings thereon are frequently obstructed during use of the container, such as by the consumer's hand during consumption of a beverage from a beverage container. Metal tabs used to open containers provide a unique and effective surface for marking with advertising and other indicia in new and creative ways. Unlike the container body, consumers naturally look at the tab to open the container. Further, the tab is typically not obstructed or blocked during consumption of a beverage from a beverage container.

Pull tabs, or "tabs" as discussed herein, are formed separately from the container body during an end closure manufacturing process. The manufacture of container end closures requires a number of processing steps collectively referred to as a conversion process. A typical conversion process is generally illustrated and described in "How Ball Makes Beverage Ends," available at http://www.ball.com/images/ball_com/product_options_files/How_Ball_Makes_Beverage_Ends.pdf (last visited Mar. 16, 2015) and U.S. Pat. No. 6,533,518, which are incorporated herein by reference in their entirety. During the conversion process, an uncoiler feeds a continuous sheet of metal tab stock into a conversion press. The conversion press forms the sheet of metal into tabs and interconnects the tabs to the end closure with a rivet. Various methods of marking container tabs and other components of beverage containers are described in U.S. Pat. Nos. 6,105,806, 7,972,426, 7,638,252, 8,146,768, U.S. Patent Application No. 2005/0045637, U.S. Patent Application No. 2013/0075401, U.S. Patent Application No. 2013/0270269, and PCT International Publication No. WO 2013/049320 which are incorporated herein by reference in their entirety.

In some cases, embossing or incising processes have been used to mark containers and tabs. Embossing or incising, via stamping, can require an undesirably large inventory of tools for different kinds of lettering or symbols forming the marks. Further, embossing or incising processes typically require the need to shut down an assembly line or conversion press to disassemble the conversion press whenever it is necessary to replace tools for maintenance or repairs or to change the mark being incised or embossed. Such shutdowns are particularly troublesome when it is desirable to change the marks with relatively high frequency, such as when markings on containers or tabs are intended to be used as part of a contest or sweepstakes in which there are preferably a relatively large number of different possible markings or indicia. Furthermore, it is difficult to accurately control the depth of embossing or incising and, in some cases, embossing or incising that is too deep may lead to leakage or container/end closure failure.

Another process which has been used for placing markings on containers and tabs has been one or more printing processes. Contact or press printing is sometimes useful for decorating or placing markings on containers where it is desired to place a relatively large number of identical markings on containers. However, contact printing is believed impractical for many components, such as tabs, because of the shape or position of the tab. Contact printing is also inefficient when it is desired to change the marks with relatively high frequency because of the need to stop a production line and at least partially disassemble the contact print device in order to change the configuration of the markings being printed on the tabs.

In some situations, components of containers, including tabs, may be marked using a non-contact printing process such as an inkjet process. Although inkjet equipment can be controlled to provide changes in markings, inkjet processes and equipment have been found to be relatively unreliable and to require frequent maintenance and repair. Inkjet processes have also been found to be subject to unwanted placement or positioning of ink. For example, inkjet printing can result in a mist of ink which can interfere with the printing process, cause undesired markings on containers, or cause equipment malfunction. In some cases, the use of an inkjet process can result in the loss of up to 20% or more of potential production time due to the need for clean up, maintenance, and/or repair. It has also been found difficult to achieve reliable adhesion of the ink to containers or container components. Additionally, inkjet processes have been difficult to provide at high speed without slowing the conversion press and while maintaining print quality to mark letters or other indicia without distortion. Finally, inkjet printing and direct contact printing processes provide only surface markings without forming indentations or otherwise altering the containers or container components. Accordingly, inkjet and other printing processes are generally inappropriate for use in connection with contest sweepstakes or to provide other valuable tokens or indicia as there is an undesirably large potential for counterfeiting or altering of the markings in an attempt to claim a contest or sweepstakes prize.

Some or all of the above difficulties in previous container marking systems and methods are particularly troublesome for metallic containers or container components such as typical aluminum alloy beverage containers and tabs. As compared with plastic or other container materials, metallic containers can be relatively difficult to mark, at least because it can be difficult to adhere ink to metal surfaces, because of the harder surfaces of metallic containers, and because of the higher melting or softening point of the metal material of the metallic containers. Further, marking systems must be capable of operating quickly to ensure downstream production equipment, such as the conversion press, can operate at a rated speed of approximately 750 cycles (or strokes) per minute. Accordingly, devices and processes used in connection with some container materials are not necessarily applicable to others. Further, in most situations, the functions or purposes of markings placed on metallic containers will rarely justify use of different methods and apparatus which would involve expenses that are substantially in excess of those involved with current methods and apparatus or that require operating the production line at a slower speed.

One known system of decorating tabs is described in U.S. Pat. No. 6,498,318 which is incorporated herein by reference in its entirety. The system described in U.S. Pat. No. 6,498,318 solves the problems described above by using laser light to mark the sheet of metal tab stock used to form a tab. The system marks the tab stock before the conversion press forms the tab stock into tabs and interconnects the tabs to the end closures. However, the system is directly integrated to the conversion press and cannot operate out of phase with the conversion press. Because the system cannot run independently of the feed rate of the conversion press, the available laser print times are limited and cannot be increased without reducing the speed of the conversion press.

Another method of decorating tabs involves coating the tabs or tab stock with a lacquer including a color agent or a lacquer having photonically active material. A laser then removes predetermined portions of the lacquers (or alters the appearance of the lacquers) to form an image. These methods of marking tabs are generally considered to be unsuitable as the lacquers added to the tab unacceptably increase the productions costs of tabs substantially in excess of those involved with current processes.

Some other methods describe the use of more powerful lasers to form a desired mark on the tab. For example, one method describes the use of a 200 Watt or a 600 Watt laser. However, the energy required to power lasers of these strengths makes their use uneconomical in an end closure manufacturing process where several hundred thousand or millions of tabs are manufactured daily. For example, in one known end closure manufacturing facility up to 5 million tabs are manufactured daily.

Accordingly, there is an unmet need for systems and methods of marking containers and tabs that can be removably integrated with a container end closure production line and that can operate out of phase with the container end closure production line without decreasing the efficiency, or increasing the costs, of current container end closure manufacturing processes.

SUMMARY OF THE INVENTION

The present invention provides systems and methods for forming and/or marking continuous sheets of material (including tab stock that is subsequently formed into tabs) in a cost-effective, fast, and reliable manner. The marked tab stock is subsequently formed into pull tabs that can be interconnected to a container end closure by a conversion press.

One aspect of the present invention is to provide a system and method that increases the time available to perform an operation on a continuous sheet of material without reducing the cycle rate of other equipment in a coil fed production process. The system can include a servo feed unit that can move the continuous sheet of material into a zone where the operation is performed at a rate faster than the other equipment in the coil fed production process. Thus, more time is provided to perform the operation without slowing the other equipment in the production process. In one embodiment, the operation comprises forming a mark or indicia on the continuous sheet of material. Optionally, a laser can be used to form the mark on the continuous sheet. Accordingly, by increasing the time available for the laser to form the mark, more complex graphics, letters, numbers, and the like can be formed. Alternatively, by increasing the time available, the laser can form the mark at a lower power setting, thereby reducing operating costs. In another embodiment, the operation comprises one or more of a cutting, a punching, a shaping, and/or a forming step on a predetermined portion of the continuous sheet of material. In one embodiment, the continuous sheet of material is aluminum tab stock.

In one embodiment, the system can include a sensor to determine a position of the mark or indicia on the continuous sheet of material. In one embodiment, the sensor is a camera. If the mark is not in a predetermined position on the continuous sheet of material, the system can adjust a length of the continuous sheet of material fed into the zone where the operation is performed to assure proper positioning. More specifically, if the mark is too close to an upstream side of a portion of the continuous sheet of material, the servo feed unit can feed a decreased length of the continuous sheet of material into the operation zone. Alternatively, if the mark is too close to a downstream side of the portion of the continuous sheet of material, the servo feed unit can feed an increased length of the continuous sheet of material into the operation zone. In this manner, subsequent marks are formed in the corrected position.

Another aspect of the invention is performing any type of operation on a continuous sheet of material where the speed of the continuous sheet of material needs to be controlled while the operation is being performed. In one embodiment, the operation can include, but is not limited to, cutting, punching, shaping, or forming the material or marking the material with an indicia. For example, the operation can comprise cutting a blank from the continuous sheet. The blank can subsequently be formed into an end closure or a metallic cup for a container body. Alternatively, the operation can include forming a score or an aperture in the continuous sheet of material. The operation may alternatively comprise marking the material with indicia. The material can comprise, but is not limited to, metal, plastic, or paper.

Another aspect of the present invention is to provide a marking system that can quickly and efficiently be removably integrated into a coil fed production process. In one embodiment, the coil fed production process is a container end closure manufacturing process.

Another aspect of the present invention is to provide improved, economical, and reliable systems and methods for applying indicia or marks to predetermined locations of a continuous sheet of stock material at high speed without slowing downstream production equipment. In one embodiment, the stock material is aluminum tab stock. Optionally, the downstream production equipment can include a container end closure conversion press. In another embodiment, the stock material is aluminum end closure stock and the downstream production equipment can include a shell press and a conversion press. In one embodiment, the systems and methods include a camera configured to take a picture of a mark on the continuous sheet of stock material. If the mark is not in a predetermined location, an increased amount, or a decreased amount, of the continuous sheet of stock material can be moved into the system. In this manner, a position of a subsequent mark on the continuous sheet of stock material is adjusted to be in the predetermined location.

Yet another aspect of the present invention is to provide a system and method of marking material that can operate out of phase compared to upstream and/or downstream production equipment. The system optionally includes an infeed accumulation device for the material before the material is marked. The system also can include an outfeed accumulation device for the material after it is marked. The system is operable to monitor and determine the amount of material in the infeed and outfeed accumulation devices and adjust the cycle rate of at least one of the system, the upstream equipment, and the downstream equipment. In one embodiment, the upstream equipment comprises a tab stock uncoiler that supplies tab stock to the infeed accumulation device. The downstream production equipment comprises a container end closure conversion press that draws in the marked material from the outfeed accumulation device. In another embodiment, the upstream equipment comprises an uncoiler for aluminum end closure stock and a pinch roll stand. The pinch roll stand supplies the end closure stock to the infeed accumulation device. The downstream production equipment comprises a shell press that draws in the marked material from the outfeed accumulation device.

It is another aspect of the present invention to provide an apparatus for controlling the input and output speed of a continuous sheet of metallic tab stock while providing indicia in a predetermined location. The apparatus can include, but is not limited to: (1) an infeed accumulation device to receive the continuous sheet of metallic tab stock; (2) an infeed loop sensor to determine an amount of the continuous sheet of metallic tab stock in the infeed accumulation device; (3) a servo feed unit to move a predetermined length of the continuous sheet of metallic tab stock into a marking area at a predetermined rate; (4) a marking apparatus to form an indicia on a surface of the continuous sheet of metallic tab stock; (5) an outfeed accumulation device to receive the continuous sheet of metallic tab stock after the marking apparatus has formed the indicia on the continuous sheet of metallic tab stock; and (6) an outfeed loop sensor to determine an amount of the continuous sheet of metallic tab stock in the outfeed accumulation device. The continuous sheet of metallic tab stock can subsequently be formed into tabs adapted for interconnection to a container end closure.

In one embodiment, the marking apparatus is a laser unit adapted to form the indicia on one or more surfaces of the continuous sheet of metallic tab stock. The laser unit is operable to form the indicia in less than approximately 60 milliseconds. The indicia can be any combination of letters, numbers, symbols, and images arranged in any order or orientation and of any size. In another embodiment, the servo feed unit is operable to move the predetermined length of the continuous sheet of metallic tab stock into the marking area in less than approximately 35 milliseconds. In another embodiment of the present invention, the apparatus can operate at up to, or greater than, approximately 800 cycles per minute.

In one embodiment, the apparatus optionally includes a sensor to determine a position of the indicia on the continuous sheet of metallic tab stock. In another embodiment, the sensor is a camera. If the indicia is not in a predetermined position on the continuous sheet of metallic tab stock, the apparatus can adjust the predetermined length of the continuous sheet of metallic tab stock fed into the marking area. In yet another embodiment, the servo feed unit is operable to alter the predetermined length of the continuous sheet of metallic tab stock moved into the marking area to adjust a location of the indicia formed on the continuous sheet of metallic tab stock by the marking apparatus. More specifically, if the indicia is too close to an upstream side of a segment or a portion of the continuous sheet of metallic tab stock, the servo feed unit can feed a decreased length of the continuous sheet of metallic tab stock into the marking area. Alternatively, if the indicia is too close to a downstream side of the portion of the continuous sheet of metallic tab stock, the servo feed unit can feed an increased length of the continuous sheet of metallic tab stock into the marking area. In this manner, subsequent indicia are formed in the predetermined position.

In one embodiment, the predetermined rate of the servo feed unit can be altered to adjust the length of the continuous sheet of metallic tab stock in one or more of the infeed and outfeed accumulation devices. In another embodiment, a period of time for the marking apparatus to form the indicia can be altered to adjust the length of the continuous sheet of metallic tab stock in one or more of the infeed and outfeed accumulation devices.

In one embodiment, the infeed loop sensor measures a distance to a predetermined portion of the continuous sheet of metallic tab stock in the infeed accumulation device. The predetermined portion of the continuous sheet of metallic tab stock can optionally comprise one or more of: (i) a lowermost portion of the continuous sheet of metallic tab stock, and (ii) a transition point between a generally linear portion of the continuous sheet of metallic tab stock and a trough of the continuous sheet of metallic tab stock. Additionally or alternatively, the infeed loop sensor can comprise a first sensor in a first portion of the infeed accumulation device and a second sensor in a second portion of the infeed accumulation device. In one embodiment, the first sensor is aligned with a position of an insufficient amount of the continuous sheet of metallic tab stock and the second sensor is aligned with a position of an excessive amount of the continuous sheet of metallic tab stock. Accordingly, when a predetermined portion of the continuous sheet of metallic tab stock within the infeed accumulation device is between the first sensor and the second sensor, a sufficient amount of metallic tab stock is within the infeed accumulation device. In another embodiment, the first sensor is configured to determine when an insufficient amount of the continuous sheet of metallic tab stock is in the infeed accumulation device. Continuing this example, the second sensor is configured to determine when an excessive amount of the continuous sheet of metallic tab stock is in the infeed accumulation device.

In another embodiment, the outfeed loop sensor measures a distance to a predetermined portion of the continuous sheet of metallic tab stock in the outfeed accumulation device. The predetermined portion of the continuous sheet of metallic tab stock can optionally comprise at least one of: (i) a lowermost portion of the continuous sheet of metallic tab stock; and (ii) a transition point between a generally linear portion of the continuous sheet of metallic tab stock and a trough of the continuous sheet of metallic tab stock. Additionally or alternatively, the outfeed loop sensor may comprise a first sensor in a first portion of the outfeed accumulation device and a second sensor in a second portion of the outfeed accumulation device. The first sensor is aligned with a position of an insufficient amount of the continuous sheet of metallic tab stock and the second sensor is aligned with a position of an excessive amount of the continuous sheet of metallic tab stock. Accordingly, when a predetermined portion of the continuous sheet of metallic tab stock within the outfeed accumulation device is between the first sensor and the second sensor, a sufficient amount of metallic tab stock is within the outfeed accumulation device.

Yet another aspect of the present invention to provide a first apparatus that performs a first operation on a continuous sheet of metallic material. The first apparatus generally can include, but is not limited to: (1) a servo unit that operates to move the continuous sheet of metallic material into the first apparatus at a predetermined rate; (2) an apparatus operable to perform the first operation on at least a portion of the continuous sheet of metallic material in a predetermined period of time; (3) an outfeed device to accumulate the continuous sheet of metallic material after the first operation is performed; and (4) an outfeed sensor to measure a length of the continuous sheet of metallic material in the outfeed device. In one embodiment, a rate of the first operation is adjustable to provide (or accumulate) a predetermined length of the continuous sheet in the outfeed device. In one embodiment, a second apparatus operable to perform a second operation at a second rate receives the continuous sheet of metallic material from the outfeed device.

Optionally, the first apparatus can further comprise one or more of: (i) an infeed device to accumulate the continuous sheet of metallic material before the first operation is performed, and (ii) an infeed sensor to measure a length of the continuous sheet of metallic material in the infeed device. The rate of the first operation is adjustable to accumulate a predetermined length of the continuous sheet in the infeed device. The first apparatus can optionally include a control system operable adjust the rate of the first operation in response to a change in the second rate of the second apparatus.

In one embodiment, the apparatus can further include a sensor to collect an image of the operation performed on the continuous sheet of metallic material. The sensor can comprise a camera or other device capable of determining an indication of the operation performed on the continuous sheet of metallic material. In one embodiment, the operation comprises forming an indicia on the continuous sheet of metallic material and the sensor is operable to collect an image of the indicia. Optionally, the sensor is capable of determining a location of the indicia formed on the continuous sheet of metallic material. In another embodiment, the servo unit is operable to alter a length of the continuous sheet of metallic material moved into the first apparatus. In one embodiment, the servo unit is operable to decrease the length of the continuous sheet of metallic material moved into the first apparatus when data collected by the sensor indicates the indicia is too close to an upstream side of the portion of the continuous sheet of metallic material. In another embodiment, the servo unit is operable to increase the length of the continuous sheet of metallic material moved into the first apparatus when data collected by the sensor indicates the indicia is too close to a downstream side of the portion of the continuous sheet of metallic material.

Optionally, the first apparatus is operable to perform the first operation on a first surface of the continuous sheet of metallic material and a different operation on a second surface of the continuous sheet. In another embodiment, the first apparatus comprises a laser unit that forms an indicia on a predetermined portion of the continuous sheet of metallic material. The laser unit can optionally comprise a first laser unit to form an indicia on the first surface and a second laser unit to form an indicia on the second surface. In one embodiment, the indicia comprise any combination of letters, numbers, symbols, and images arranged in any order or orientation and of any size. In still another embodiment, the continuous sheet of metallic material comprises aluminum tab stock formed into tabs for end closures by a conversion press.

Additionally or alternatively, measuring the length can comprise measuring a change in a distance between the outfeed sensor and a predetermined portion of the continuous sheet of metallic material in the outfeed device. In one embodiment, the predetermined portion measured by the outfeed sensor comprises a lowermost portion of the continuous sheet of metallic material. Alternatively, in another embodiment, the predetermined portion measured by the outfeed sensor comprises a transition point between a generally linear portion and a trough of the continuous sheet of metallic material.

In another embodiment, the outfeed sensor comprises a first outfeed sensor in a first portion of the outfeed device and a second outfeed sensor in a different second portion of the outfeed device. Accordingly, measuring the length comprises determining that a predetermined portion of the continuous sheet of metallic material is between the first outfeed sensor and the second outfeed sensor. If the predetermined portion of the continuous sheet is not between the first and second sensors, an excessive or an insufficient length of the continuous sheet is in the outfeed device. Optionally, the first outfeed sensor is aligned with a position of an insufficient amount of the continuous sheet of metallic material and the second outfeed sensor is aligned with a position of an excessive amount of the continuous sheet of metallic material.

It is yet another aspect of the present invention to provide a method of controlling an input rate and an output rate on a continuous sheet of metallic material. The method generally comprises: (1) accumulating a first length of slack in the continuous sheet of metallic material before a first apparatus performs a first operation; (2) performing the first operation with the first apparatus on the continuous sheet of metallic material; (3) accumulating a second length of slack in the continuous sheet of metallic material after the first apparatus performs the first operation; (4) monitoring the first length of slack and the second length of slack; and (5) adjusting a rate of the first operation performed by the first apparatus to alter at least one of the first length of slack and the second length of slack. The first apparatus can perform the first operation at a variable rate. Optionally, the first operation performed by the first apparatus can include performing an operation on one or more of a first surface and a second surface of the continuous sheet of metallic material.

In one embodiment, a laser unit forms a mark on the continuous sheet of metallic material during the first operation. The laser unit can optionally comprise a first laser unit operable to form a mark on the first surface and a second laser unit operable to form a mark on the second surface. In one embodiment, the mark can comprise any combination of letters, numbers, symbols, and images arranged in any order or orientation and of any size.

In one embodiment, an infeed sensor monitors the first length of slack in the continuous sheet of metallic material. An outfeed sensor monitors the second length of slack in the continuous sheet of metallic material. In one embodiment, the infeed and outfeed sensors measure a distance to a predetermined portion of the continuous sheet of metallic material in the first and second lengths of slack. The predetermined portions of the continuous sheet of metallic material can optionally comprise at least one of: (i) a lowermost portion of the continuous sheet of metallic material; and (ii) a transition point between a generally linear portion and a trough of the continuous sheet of metallic material.

In one embodiment, the method further comprises collecting an image of the continuous sheet of metallic material after the first apparatus performs the first operation. In one embodiment, the image is collected by a camera. The method can further comprise determining if the first operation was performed in a predetermined portion of the continuous sheet of metallic material. If the first operation was not performed in the predetermined portion, the method can optionally include adjusting a length of the continuous sheet of metallic material moved into the first apparatus by a servo unit. In one embodiment, when the first operation was performed in a position upstream of the predetermined portion (for example, too close to an upstream side of a portion of the continuous sheet of metallic material), the method can include decreasing the length of the continuous sheet of metallic material moved into the first apparatus by the servo unit. Alternatively, in another embodiment, when the first operation was performed in a position downstream of the predetermined portion (for example, too close to a downstream side of the portion of the continuous sheet of metallic material), the method can include increasing the length of the continuous sheet of metallic material moved into the first apparatus by the servo unit.

Additionally, or alternatively, the method can include adjusting the amount of time for the servo unit to move a predetermined length of the continuous sheet of metallic material into the first apparatus. In one embodiment, the servo unit can move the predetermined length of the continuous sheet of metallic material into the first apparatus in less than about 35 milliseconds. In one embodiment, the first apparatus can perform the first operation at a rate of up to, or greater than, approximately 800 cycles per minute. In another embodiment, the first apparatus can perform the first operation in less than approximately 60 milliseconds.

In another embodiment, a second apparatus that performs a second operation on the continuous sheet of metallic material receives the continuous sheet of metallic material from the second length of slack. The second apparatus can perform the second operation at a second different rate that is not impaired by the rate of the first operation performed with the first apparatus. In yet another embodiment, the second apparatus comprises a conversion press that forms the continuous sheet of metallic material into tabs adapted for interconnection to a container end closure.

One aspect of the present invention is an apparatus for providing indicia in a predetermined location of a continuous sheet of metallic tab stock. The apparatus can generally include, but is not limited to: (1) an infeed accumulation device operable to receive the continuous sheet of metallic tab stock; (2) a servo feed unit operable to move a predetermined length of the continuous sheet of metallic tab stock into a marking area; (3) a marking apparatus operable to form an indicia on the continuous sheet of metallic tab stock; (4) an outfeed accumulation device operable to receive the continuous sheet of metallic tab stock after the marking apparatus has formed the indicia; and (5) a camera operable to collect an image of the indicia formed on the continuous sheet of metallic tab stock. In one embodiment, the continuous sheet of metallic tab stock can subsequently be formed into tabs adapted for interconnection to container end closures.

The marking apparatus can be a laser unit adapted to form the indicia. In one embodiment, the marking apparatus comprises one or more of: (i) a first laser unit to form an indicia on a first surface of the continuous sheet of metallic tab stock; and (ii) a second laser unit to form an indicia on a second surface of the continuous sheet of metallic tab stock.

The apparatus can optionally include a control unit operable to determine if the indicia in the image collected by the camera is in the predetermined location. In one embodiment, the control unit is operable to send an instruction to the servo feed unit to increase the predetermined length when the indicia in the image is too close to a downstream side of a segment or portion of the continuous sheet of metallic tab stock. Additionally, or alternatively, the control unit is operable to send an instruction to the servo feed unit to decrease the predetermined length when the indicia in the image is too close to an upstream side of the portion of the continuous sheet of metallic tab stock.

In one embodiment, the control unit is operable to send an instruction to the servo feed unit to alter the predetermined length after determining that a predetermined number of indicia are not in the predetermined location. In one embodiment, the control until can wait to send the instruction until determining that three consecutive indicia are not in the predetermined location. Additionally, or alternatively, the control system can send the instruction after determining three indicia in a sample of ten indicia are not in the predetermined location.

In one embodiment, the servo feed unit is operable to alter the predetermined length of the continuous sheet of metallic tab stock moved into the marking area to adjust a location of the indicia formed on the continuous sheet of metallic tab stock by the marking apparatus. Optionally, the servo feed unit alters the predetermined length in response to a signal from the control unit.

Another aspect of the present invention is a non-transitory computer readable medium comprising a set of instructions stored thereon which, when executed by a processor of a control unit, cause the processor to adjust components of an apparatus that performs an operation on a continuous sheet of metallic material. The instructions include one or more of, but are not limited to, an instruction to: (1) signal a servo unit to move a predetermined length of the continuous sheet of metallic material into the apparatus; (2) receive an image collected by a sensor of an indicia formed on the continuous sheet of metallic material; (3) determine if the indicia in the image is in a predetermined location; (4) prepare an instruction for the servo unit to alter the predetermined length when the indicia is not in the predetermined location; and (5) send the instruction to the servo unit. In one embodiment, the sensor is a camera or other device capable of forming an image of the indicia formed on the continuous sheet of metallic material. In another embodiment, preparing the instruction can include determining a magnitude of an error in a location of the indicia.

In one embodiment, the instruction causes the servo unit to increase the predetermined length when the indicia in the image is too close to a downstream side of a portion of the continuous sheet of metallic material. In another embodiment, the instruction causes the servo unit to decrease the predetermined length when the indicia in the image is too close to an upstream side of a portion of the continuous sheet of metallic material.

The instructions can include an instruction to count a predetermined number of indicia that are not in the predetermined location before sending the instruction to the servo unit. In one embodiment, the instructions cause the processor to wait until determining a predetermined number of consecutive indicia are not in the predetermined location before the instruction is sent to the servo unit. Additionally, or alternatively, the instructions can cause the processor to wait until after determining a predetermined number of indicia are not in the predetermined location in a sample of a predetermined number of indicia before the instruction is sent to the servo unit. In one embodiment, the processor can wait until after determining three indicia are not in the predetermined location in a sample of ten indicia before the instruction is sent to the servo unit. Optionally, the processor can wait until determining that at least approximately 40 percent of the indicia in a sample of a predetermined number of indicia are not in the predetermined location before sending the instruction to the servo unit.

Optionally, after sending the instruction to the servo unit, the instructions can cause the processor to wait a predetermined number of cycles of the apparatus before sending a second instruction for the servo unit to alter the predetermined length. In one embodiment, the processor can wait for from two to sixty cycles of the apparatus before sending the second instruction to the servo unit.

In one embodiment, the computer readable medium further comprises instructions for at least one of: (i) monitoring an amount of the continuous sheet of metallic material in an outfeed device; and (ii) sending an instruction to a marking apparatus to alter a rate at which the indicia is formed to accumulate a predetermined length of the continuous sheet of metallic material in the outfeed device.

Still another aspect is a method of controlling an apparatus that performs an operation on a continuous sheet of metallic material, comprising one or more of: (1) accumulating a first length of slack in the continuous sheet of metallic material before the apparatus performs the operation; (2) feeding a predetermined length of the continuous sheet of metallic material into the apparatus; (3) performing the operation on a first portion of the continuous sheet of metallic material by the apparatus; (4) accumulating a second length of slack in the continuous sheet of metallic material after the apparatus performs the operation; (5) determining if the apparatus performed the operation at a predetermined location of the first portion of the continuous sheet of metallic material; and (5) adjusting the predetermined length of the continuous sheet of metallic material fed into the apparatus such that the apparatus performs the operation at a predetermined location of a second portion of the continuous sheet of metallic material. In one embodiment, the continuous sheet of metallic material comprises tab stock.

The method can further include increasing the predetermined length of the continuous sheet of metallic material fed into the apparatus when the apparatus performed the operation too close to a downstream side of the first portion of the continuous sheet of metallic material. Additionally, or alternatively, the method can include decreasing the predetermined length of the continuous sheet of metallic material fed into the apparatus when the apparatus performed the operation too close to an upstream side of the first portion of the continuous sheet of metallic material.

Optionally, in one embodiment the method can include counting a predetermined number of errors in locations of operations performed by the apparatus before adjusting the predetermined length of the continuous sheet of metallic material fed into the apparatus. In one embodiment, a predetermined number of consecutive errors in locations can be observed before adjusting the predetermined length. In one embodiment, the method can include waiting until after three consecutive errors in locations are observed before adjusting the predetermined length. Alternatively, in another embodiment, a predetermined number of errors in locations in a sample of a predetermined number of operations can be observed before adjusting the predetermined length. In one embodiment, the method can include waiting until after determining three operations include errors in location out of a sample of ten operations before adjusting the predetermined length.

In one embodiment, after adjusting the predetermined length, the method can include waiting a predetermined number of cycles of the apparatus before adjusting the predetermined length a second time. The method can include waiting from 2 to 60 cycles before adjusting the predetermined length the second time. Optionally, the method can include waiting from 30 to 60 cycles before adjusting the predetermined length the second time.

As will be appreciated by one of skill in the art, the method and apparatus of the current invention can be used to perform an operation of any type on a continuous sheet of any material including without limitation aluminum, tin, steel, plastic, paper, and combinations thereof. Further, the method and apparatus of the current invention can be used in any coil fed manufacturing process to enable a first apparatus to operate out of phase with other components of the coil fed system and without impairing the operating rate of a second apparatus.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about." Accordingly, unless otherwise indicated, all numbers expressing quantities, dimensions, conditions, ratios, ranges, and so forth used in the specification and claims can be increased or decreased by approximately 5% to achieve satisfactory results. In addition, all ranges described herein can be reduced to any sub-range or portion of the range, or to any value within the range without deviating from the invention.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol- or standard defined or specific communication session or interaction, such as Voice-Over-Internet-Protocol ("VoIP), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™ Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s).

The term "screen," "touch screen," "touchscreen," or "touch-sensitive display" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The terms "determine," "calculate," and "compute," and variations thereof, as used herein, are used interchangeably and include any type of methodology, process, mathematical operation, or technique.

The Summary of the Invention is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF DRAWINGS

The accompanying drawings, which are incorporated herein and constitute a part of the specification, illustrate embodiments of the invention and together with the Summary of the Invention given above and the Detailed Description of the drawings given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. As will be appreciated, other embodiments are possible using, alone or in combination, one or more of the features set forth above or described below. For example, it is contemplated that various features and devices shown and/or described with respect to one embodiment can be combined with or substituted for features or devices of other embodiments regardless of whether or not such a combination or substitution is specifically shown or described herein. Additionally, it should be understood that the drawings are not necessarily to scale.

Figure 1:
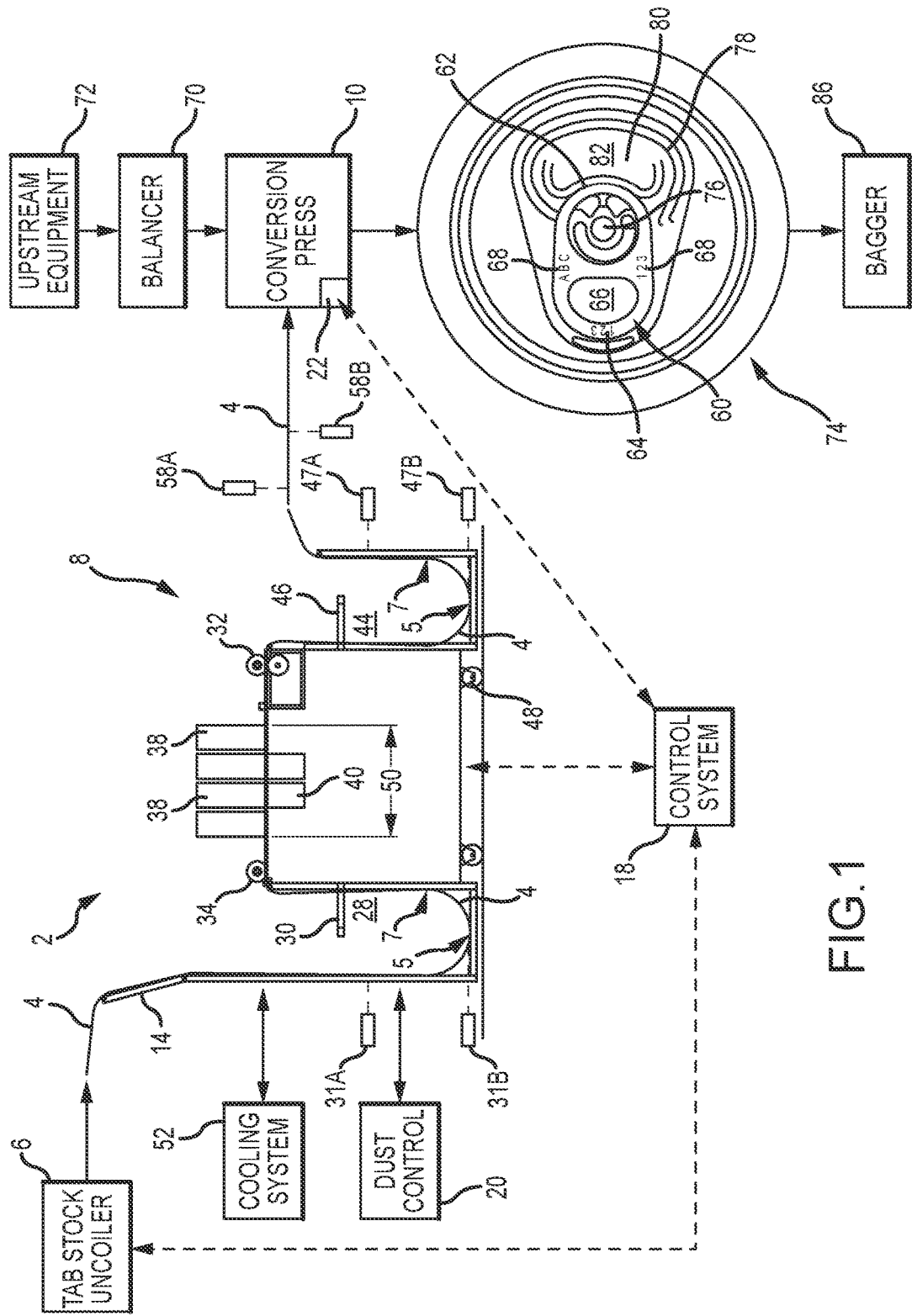
FIG. 1 is a schematic flow diagram of a system of one embodiment of the present invention that includes an apparatus that performs an operation on a continuous sheet of material, the apparatus being removably integrated with an uncoiler and a conversion press of an end closure manufacturing system.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
|---|---|
| 2 | System |
| 4 | Continuous sheet of material |
| 5 | Lowermost portion of the continuous sheet |
| 6 | Uncoiler for the continuous sheet |
| 7 | Transition point of the continuous sheet |
| 8 | Apparatus |
| 10 | Conversion press |
| 14 | Loop stand |
| 18 | Control system |
| 20 | Dust control system |
| 22 | Encoder |
| 26 | Coil of continuous sheet of material |
| 28 | Infeed accumulation device |
| 30 | Infeed loop sensor |
| 31 | Infeed loop sensors |
| 32 | Servo feed unit |
| 34 | Stabilizing roller |
| 35 | Predetermined length of the continuous sheet of material |
| 36 | Portion or segment of sheet material |
| 37 | Width of sheet material |
| 38 | Operation performing unit |
| 39A | Upstream side of sheet portion |
| 39B | Downstream side of sheet portion |
| 40 | Operation performing unit |
| 41 | First distance |
| 42 | Second distance |
| 43 | Arrow indicating direction of movement |
| 44 | Outfeed accumulation device |
| 46 | Outfeed loop sensor |

-continued

| Number | Component |
|---|---|
| 47 | Outfeed loop sensors |
| 48 | Alignment system |
| 50 | Operation zone |
| 52 | Cooling system |
| 54 | Upper position |
| 56 | Lower position |
| 58 | Camera |
| 60 | Tab |
| 62 | Forward edge of tab |
| 64 | Grasping portion |
| 66 | Aperture in tab |
| 68 | Marks or indicia on tab |
| 70 | Balancer |
| 72 | Upstream equipment |
| 74 | End closure |
| 76 | Rivet |
| 78 | Scores |
| 80 | Tear panel |
| 82 | Pour opening |
| 86 | Bagger |
| 90 | Method |
| 92 | Start operation |
| 94 | Activate system |
| 96 | Receive signal from conversion press |
| 98 | Control system sets uncoil rate of uncoiler |
| 100 | Servo feed unit moves or draws continuous sheet into position |
| 102 | Operation performing unit performs operation |
| 103 | Determine if the operation was performed in the correct position |
| 104 | Adjust input length of the continuous sheet of material |
| 105 | Determine if sufficient length of the continuous sheet is available |
| 106 | Adjust cycle rate |
| 108 | Continue performing operations |
| 110 | End operation |
| 112 | Bus |
| 114 | Processing units or CPUs |
| 116 | Input device |
| 118 | Output device |
| 120 | Storage device |
| 122 | Computer-readable storage media reader |
| 124 | Communications system |
| 126 | Working memory |
| 128 | Processing acceleration unit |
| 130 | Database |
| 132 | Network |
| 134 | Remote database |
| 136 | Operating system |
| 138 | Other code or programs |
| 140 | User interface |
| 142 | Representation of a sheet portion |
| 144A | Upstream side of sheet representation |
| 144B | Downstream side of sheet representation |
| 146 | Image of indicia |
| 148 | Inner box |
| 150 | Median box |
| 152 | Outer box |
| 154 | Increase length icon |
| 156 | Decrease length icon |
| 160 | Increase cycle time icon |
| 162 | Decrease cycle time icon |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1, a system 2 for performing an operation on predetermined portions of a continuous sheet of material 4 is illustrated according to one embodiment of the present invention. The system 2 is removably integrated with an uncoiler 6 and a second apparatus 10. The uncoiler 6 is operable to uncoil a coil 26 (illustrated in FIG. 2) of a continuous sheet of material 4. In one embodiment, the continuous sheet of material comprises tab stock. In one embodiment, the second apparatus comprises a conversion press 10 of an end closure manufacturing process. Although the system 2 and its components are illustrated as integrated with a conversion press 10, it will be appreciated by one of skill in the art that the system 2 of the present invention can be used with any coil fed manufacturing system. More specifically, the present invention could be used in any manufacturing process where the speed of a continuous sheet of material is controlled while an operation is being performed on a selected portion of the continuous sheet of material. Thus, the invention could be used on coils of metallic, plastic, or paper material, and where punching, cutting, shaping, or marking operations are being performed at a certain speed and location.

Figure 2:
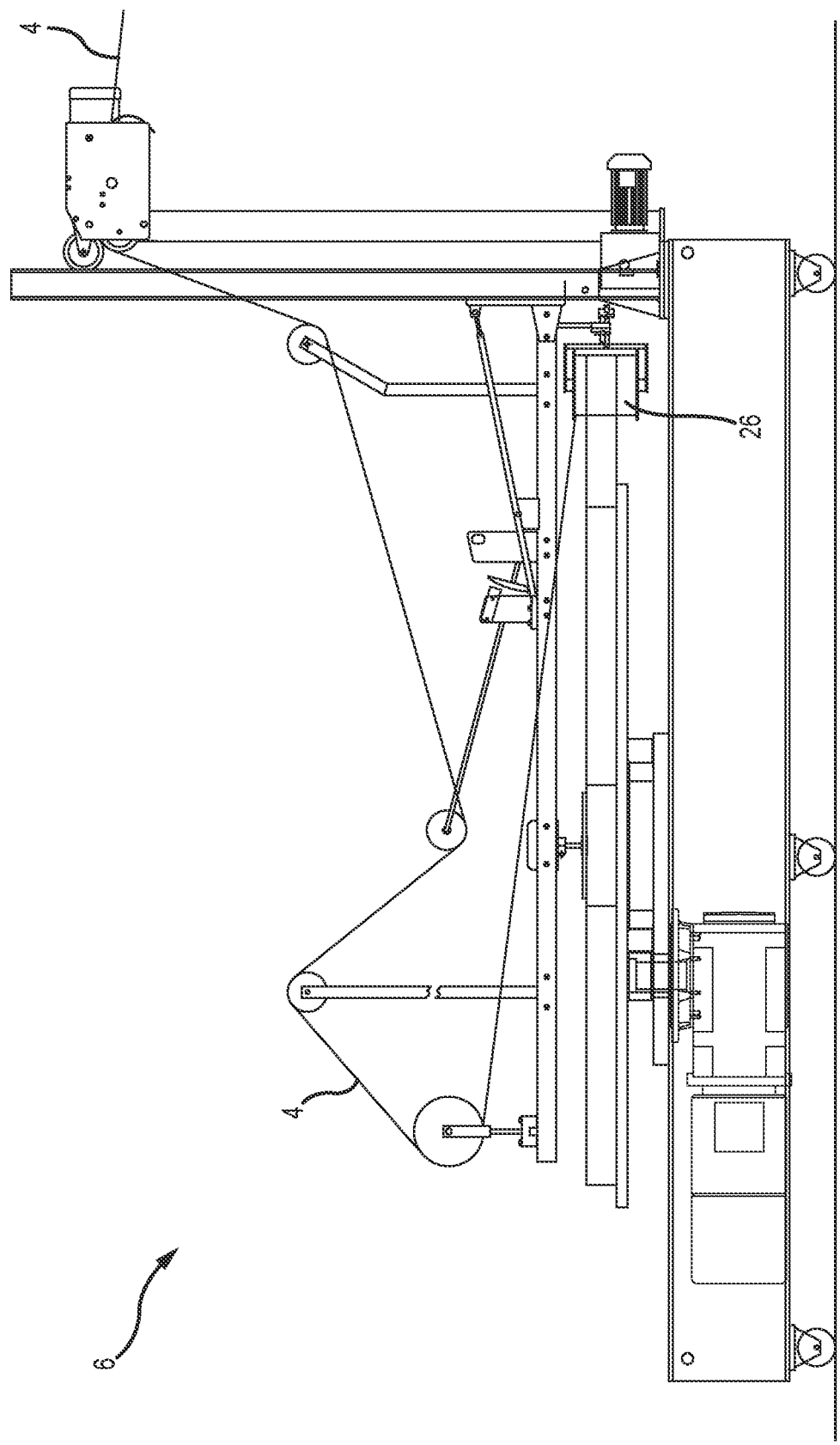
FIG. 2 is a side elevation view of an embodiment of an uncoiler for a continuous sheet of material of the present invention.

The system 2 generally includes one or more of an apparatus 8 that performs a predetermined operation on the continuous sheet of material 4, a loop stand 14, a control system 18, a dust control system 20, a cooling system 52, and an encoder 22 associated with downstream equipment 10, such as a conversion press. The system 2 receives the continuous sheet of material 4 from the uncoiler 6. The uncoiler 6 uncoils the continuous sheet of material 4 at a rate determined by the control system 18 of the system 2 as described in more detail below. The uncoil rate can be trimmed (or adjusted) by a position arm (not illustrated) of the uncoiler 6. Suitable uncoilers 6 are known to those of skill in the art and are available from a variety of suppliers including, for example, ASC Machine Tools, Inc., and Perfecto Industries, Inc., among others. An embodiment of an uncoiler 6 is illustrated in FIG. 2.

The uncoiler 6 can receive one or more coils 26 of the continuous sheet of material 4. Each coil 26 typically has a length of approximately 9,000 feet or more of sheet material. The continuous sheet of material 4 can be formed of an aluminum alloy or any other suitable material including without limitation steel, tin, plastic, paper and any combination thereof. In one embodiment, the continuous sheet of material 4 is formed of an aluminum alloy commonly referred to by those of skill in the art as 5042 aluminum.

The apparatus 8 generally includes one or more of an infeed accumulation device 28, at least one infeed loop sensor 30, 31, a servo feed unit 32, a stabilizing roller 34, at least one unit 38, 40 that performs the operation on the continuous sheet of material, a cooling system 52, an outfeed accumulation device 44, one or more outfeed loop sensors 46, 47, a camera 58, and an alignment system 48.

The loop stand 14 receives the continuous sheet of material 4 from the uncoiler 6 and aligns the continuous sheet of material with the apparatus 8. The continuous sheet of material enters the infeed accumulation device 28 of the apparatus 8. In one embodiment, the infeed accumulation device 28 is up to about 18 inches wide, up to about 24 inches long, and has a height of up to about 75 inches. In another embodiment, the infeed accumulation device 28 is about 13 inches wide, about 18 inches long, and the height is about 75 inches. In a more preferred embodiment, the width is about 12 inches, the length is about 16 inches, and the height is about 50 inches.

The infeed loop sensor 30 measures a distance from the sensor 30 to at least one predetermined portion 5, 7 of the continuous sheet of material 4 in the infeed accumulation device 28. The infeed loop sensor 30 can be a camera. In one embodiment, the infeed loop sensor 30 can include a laser. The sensor 30 receives reflected laser energy from the continuous sheet and uses the reflected laser energy to measure the distance to the predetermined portion 5, 7 at any angle. In one embodiment, the sensor 30 measures the distance to a lowermost portion 5 of the continuous sheet of material 4 in infeed accumulation device 28. In one embodiment, the lowermost portion 5 comprises a trough of the continuous sheet of material 4 in the infeed accumulation device 28. In another embodiment, the sensor 30 measures a distance between the sensor 30 and a transition point 7 from a generally linear portion of the continuous sheet of material 4 to the trough. In one embodiment, the sensor 30 is positioned to sense an interior portion of a concavity formed by the continuous sheet of material as illustrated in FIG. 1. However, it will be appreciated that the sensor 30 can be arranged differently. For example, in another embodiment, the sensor 30 can be positioned to sense an exterior portion of the concavity formed by the continuous sheet of material. More specifically, although sensor 30 is illustrated in FIG. 1 positioned above the lowermost portion 5 of the continuous sheet of material, the sensor 30 can optionally be positioned below the lowermost portion 5. Accordingly, in one embodiment, the sensor 30 senses a first side of the continuous sheet of material 4. In another embodiment, the sensor 30 senses a second side of the continuous sheet of material.

Additionally, or alternatively, sensors 31A, 31B can be arranged to monitor the position of the continuous sheet of material 4 in the infeed accumulation device 28. Sensor 31A provides a first signal to the control system 18 when the sensor 31A detects the continuous sheet of material. Continuing this example, when the sensor 31A does not detect the continuous sheet of material, the sensor 31A provides a second signal to the control system 18. Similarly, the sensor 31B in a different portion of the infeed accumulation device 28 also provides a first signal when the continuous sheet of material is detected and a different second signal when the continuous sheet of material is not detected. The sensors 31A, 31B can optionally include a laser. The sensors 31A, 31B can be positioned to receive laser energy reflected from a predetermined portion of the continuous sheet of material 4 to determine the amount of the continuous sheet of material in the infeed accumulation device. In another embodiment, one or more of sensors 31A, 31B are cameras.

The control system 18 receives information associated with the position of the continuous sheet of material 4 in the infeed accumulation device 28 from one or more of the infeed loop sensors 30, 31. Using the information from the sensors 30, 31, the control system 18 can determine the length of the continuous sheet of material 4 in the infeed accumulation device 28. For example, the control system can determine there is an excessive length, a sufficient length, or an insufficient length of the continuous sheet of material in the infeed accumulation device 28. The control system 18 can then send a signal to the uncoiler 6 to increase the uncoil rate if an insufficient length of the continuous sheet of material 4 is detected in infeed accumulation device 28. Alternatively, the control system 18 can send a signal to the uncoiler 6 to decrease the uncoil rate if an excessive length of the continuous sheet of material 4 is detected in infeed accumulation device 28. In one embodiment, the control system 18 sends signals to the uncoiler 6 to adjust the uncoil rate to keep length of continuous sheet of material in the infeed accumulation device 28 substantially constant.

In one embodiment, the control system receives a distance between the sensor 30 and a predetermined portion of the continuous sheet of material. In one embodiment, the predetermined portion comprises the lowermost portion 5 of the continuous sheet of material 4 in the infeed accumulation device 28. In another embodiment, the predetermined portion comprises a transition point 7 of the continuous sheet of material 4 in the infeed accumulation device 28.

Optionally, in another embodiment, when the sensor 31A in a first portion of the infeed accumulation device 28 does not detect the continuous sheet of material and sends the second signal to the control system, the control system can determine that an insufficient length of the continuous sheet of material 4 is detected in the infeed accumulation device 28. Similarly, when the sensor 31A detects the continuous sheet of material and the sensor 31B in a second portion of the infeed accumulation device 28 does not detect the continuous sheet of material, the control system can determine that the lowermost portion 5 of the continuous sheet of material 4 is between sensors 31A and 31B. Accordingly, the control system can determine that a sufficient length of the continuous sheet of material is in the infeed accumulation device 28. Continuing this example, when the sensor 31B detects the continuous sheet and sends the first signal to the control system, the control system can determine that too great a length of the continuous sheet of material 4, or an excessive length, is detected in the infeed accumulation device 28.

Figure 6:
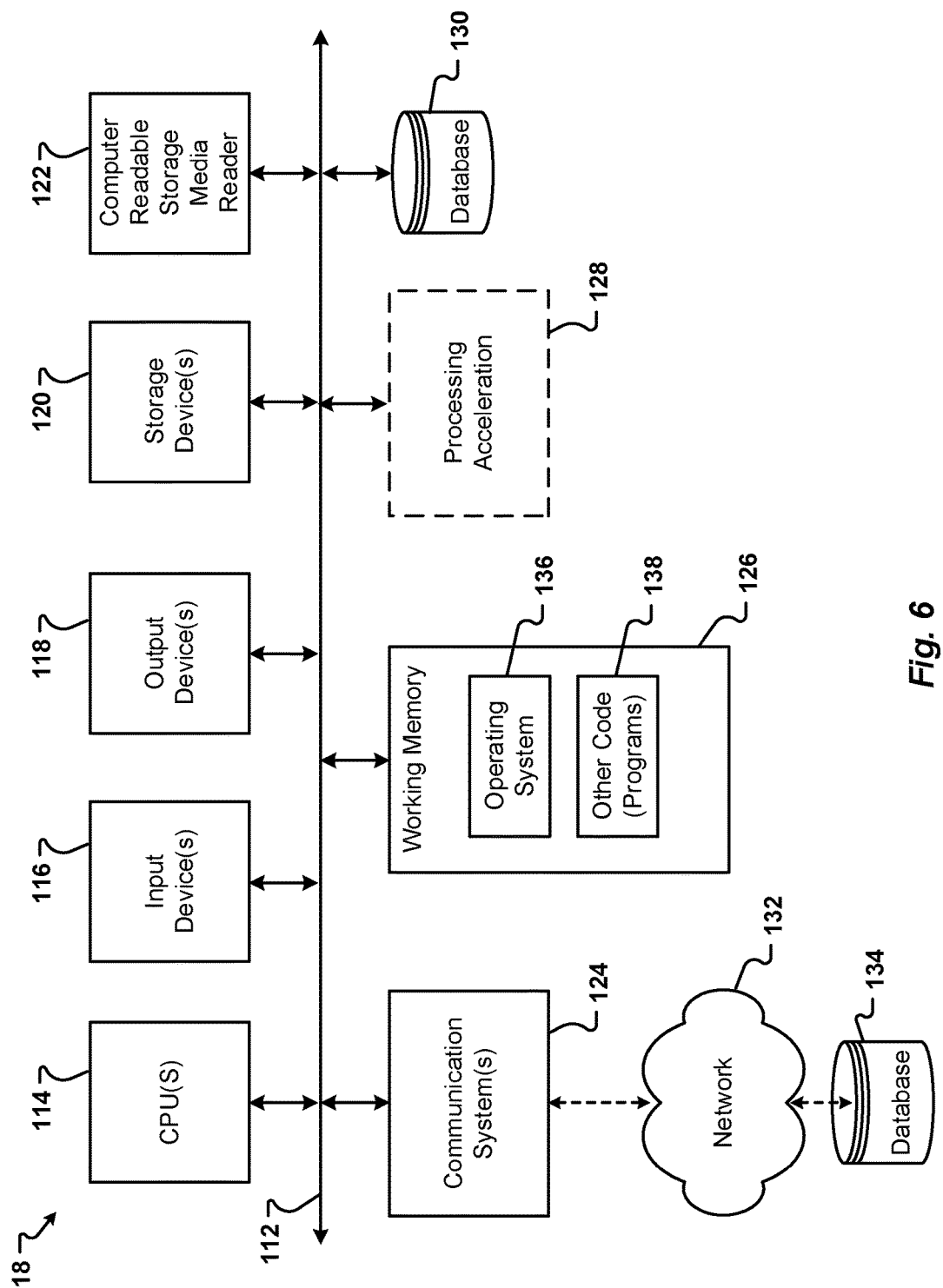
FIG. 6 is a block diagram of an embodiment of a control system of the present invention.

Referring now to FIG. 6, a control system 18 of one embodiment of the present invention is generally illustrated. More specifically, FIG. 6 generally illustrates one embodiment of a control system 18 of the present invention operable to control the system 2 and apparatus 8 of the present invention. The control system 18 is generally illustrated with hardware elements that can be electrically coupled via a bus 112. The hardware elements may include a central processing unit (CPU) 114; an input device 116 (e.g., a mouse, a keyboard, etc.); and an output device 118 (e.g., a display device, a printer, etc.). The control system 18 can also include a storage device 120. In one embodiment, the storage device(s) 120 can be disk drives, optical storage devices, solid-state storage device such as a random access memory ("RAM") and/or a read-only memory ("ROM"), which can be programmable, flash-updateable and/or the like.

The control system 18 can additionally include one or more of a computer-readable storage media reader 122; a communications system 124 (e.g., a modem, a network card (wireless or wired), an infra-red communication device, etc.); and working memory 126, which can include RAM and ROM devices as described above. In some embodiments, the control system 18 can also include a processing acceleration unit 128, which can include a DSP, a special-purpose processor and/or the like. Optionally, the control system 18 can also include a database 130.

The computer-readable storage media reader 122 can further be connected to a computer-readable storage medium, together (and, optionally, in combination with storage device(s) 120) comprehensively representing remote, local, fixed, and/or removable storage devices plus storage media for temporarily and/or more permanently containing computer-readable information. The communications system 124 can permit data to be exchanged with a network 132 and/or any other data-processing. Optionally, the control system 18 can access data stored in a remote storage device, such as database 134 by connection to the network 132. In one embodiment, the network 132 may be the internet.

The control system 18 can also comprise software elements, shown as being currently located within the working memory 126. The software elements can include an operating system 136 and/or other code 138, such as program code implementing one or more methods and aspects of the present invention.

One of skill in the art will appreciate that alternate embodiments of the control system 18 can have numerous variations from that described above. For example, customized hardware might also be used and/or particular elements might be implemented in hardware, software (including portable software, such as applets), or both. Further, connection to other computing devices such as network input/output devices can be employed.

Suitable control systems 18 are known to those of skill in the art. In one embodiment, the control system 18 is a personal computer, such as, but not limited to, a personal computer running the MS Windows operating system. Optionally, the control system 18 can be a smart phone, a tablet computer, a laptop computer, and similar computing devices. In one embodiment, the control system 18 is a data processing system which includes one or more of, but is not limited to: an input device (e.g. a keyboard, mouse, or touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor. In another embodiment, the control system 18 is a programmable logic controller (PLC). One example of a suitable PLC is a Controllogix PLC produced by Rockwell Automation, Inc, although other PLCs are contemplated for use with embodiments of the present invention.

Referring again to FIG. 1, the servo feed unit 32 is operable to receive a signal from the control system 18 to move a predetermined length 35 (illustrated in FIG. 3) of the continuous sheet of material 4 at a predetermined rate into an operation zone 50. A selected operation is performed on the continuous sheet of material in the operation zone 50 by one or more units 38, 40. Optionally, in one embodiment, the selected operation comprises a laser marking operation performed by at least one of the laser units 38, 40.

Any suitable servo feed unit 32 can be used with the system 2 of the present invention. The servo feed unit 32 can be adapted to either push or pull the continuous sheet of material 4 into the operation zone 50. Alternatively, in one embodiment of the present invention, the servo feed unit 32 can comprise two or more servo feed units that operate together to push and pull the continuous sheet of material 4 into the operation zone 50. In one embodiment, the servo feed unit 32 is operable to move the predetermined length 35 of continuous sheet of material 4 into the operation zone 50 in no more than approximately 35 milliseconds. In a more preferred embodiment, the servo feed unit 32 can move the predetermined length 35 of the continuous sheet of material 4 into the operation zone 50 in less than approximately 30 milliseconds. Suitable servo feed units 32 are known to those of skill in the art.

The rate at which the servo feed unit 32 moves the continuous sheet of material 4 into the apparatus 8 may be faster or slower than the uncoil rate of the uncoiler 6. The control system 18 can change the input speed of the servo feed unit 32 to alter the cycle rate of the system 2. The servo feed unit 32 generally moves the continuous sheet of material 4 to the operation zone 50 at a rate faster than the intake rate of the conversion press 10. In this manner, the amount of time available for the operation performed by the units 38, 40 can be increased without increasing the cycle time of the system 2, ensuring that the conversion press 10 can draw in the continuous sheet of material 4 without operating at a slower cycle rate. In one embodiment where the operation comprises laser marking of the continuous sheet of material, increasing the time available for marking also allows the laser units 38, 40 to form more complex marks on the continuous sheet of material 4. In addition or alternatively, increasing the time available for marking reduces the amount of energy required by the laser units 38, 40 to form marks 68 on the continuous sheet of material 4, reducing the operating cost of the system 2.

The control system 18 can send a signal to the servo feed unit 32 to alter the length 35 of the continuous sheet of material 4 that is moved into the operation zone 50. In this manner, the control system can adjust the location of the operation performed on the continuous sheet of material 4. In one embodiment, the control system 18 can send the signal to the servo feed unit to alter the length 35 in response to a signal received from the encoder 22. In another embodiment, the control system 18 can send the signal to alter the length automatically. More specifically, the control system 18 can receive data from a sensor 58, such as a camera 58, indicating that an indicia 68 formed on the continuous sheet of material by a unit 38, 40 is not in a predetermined portion. The camera 58 is positioned to take a picture of portions 36 of the continuous sheet of material 4 after an operation, such as the formation of a mark or indicia 68, has been performed on the continuous sheet of material. In one embodiment, a first camera 58A is positioned to take pictures of a first side of the continuous sheet of material and a second camera 58B is positioned to take pictures of the second side of the continuous sheet of material. The control system 18 is operable to determine if the indicia are in the predetermined location using data, such as pictures, received from the camera 58. If the indicia are not in the predetermined location, the control system 18 can send a signal to the servo feed unit to alter the length of the continuous sheet of material fed into the operation zone 50. The signal can increase, or decrease, the predetermined length 35.

Figure 7:
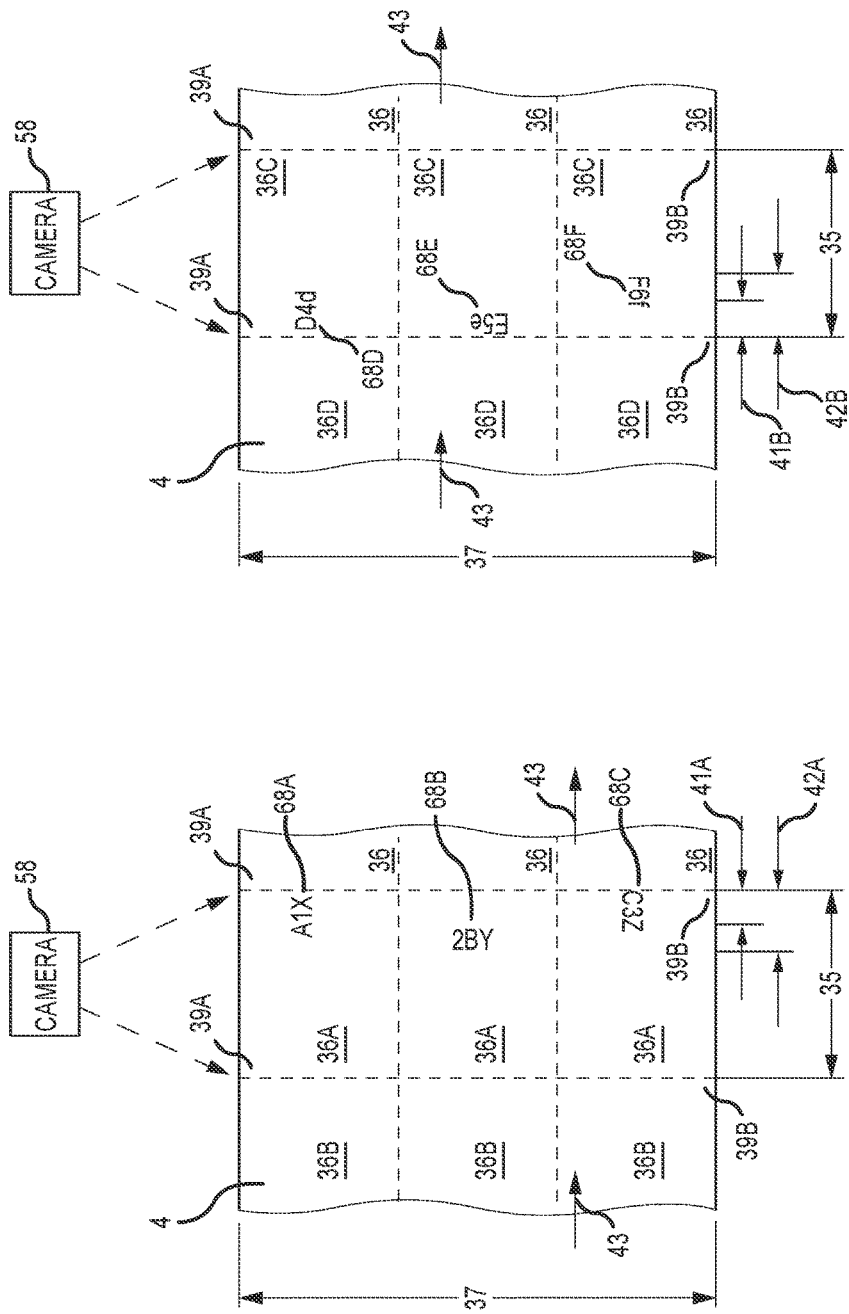
FIGS. 7A and 7B are partial top plan views of portions of a continuous sheet of material that is partially-marked and illustrate indicia that are formed in incorrect locations of the continuous sheet of material.

Referring now to FIGS. 7A and 7B, examples of indicia 68 that are not in a predetermined portion of a continuous sheet of material are illustrated. The direction of movement of the continuous sheet of material 4 is indicated by arrows 43. The camera 58 is positioned to collect a picture of indicia 68 in each portion 36 of the continuous sheet of material. The picture taken by the camera 58 is transmitted to the control system 18. The control system 18 can determine if the indicia 68 is in a predetermined position within a sheet portion 36A. For example, the indicia 68 illustrated in FIG. 7A are too close to a downstream side 39B of the sheet portion 36A. Alternatively, the picture taken by the camera 58 can indicate that the indicia 68 are positioned too close to an upstream side 39A of a sheet portion 36C as generally illustrated in FIG. 7B.

When the control system 18 determines (based on data from the camera 58) that the indicia 68 are too close to the downstream side 39B of a sheet portion 36 (as generally illustrated in FIG. 7A), the control system 18 can send a first signal to the servo feed unit 32 to increase the predetermined length 35 of the continuous sheet of material fed into the operation zone 50 (illustrated in FIG. 1) of the apparatus 8. In this manner, the control system 18 can trim (or adjust) the position of subsequent indicia 68 formed on the continuous sheet of material. For example, in response to receiving the first signal, the servo feed unit 32 can increase the predetermined length 35 of a next sheet portion 36B. In one embodiment, the first signal causes the servo feed unit 32 to increase the predetermined length 35 by a first amount. In one embodiment, the first amount is from approximately 0.005 inches to approximately 0.050 inches.

Similarly, if the control system 18 determines that the indicia 68 are too close to the upstream side 39A of a sheet portion 36C (such as illustrated in FIG. 7B), the control system 18 can send a second signal which causes the servo feed unit 32 to decrease the predetermined length 35 of the continuous sheet of material fed into the operation zone. In response to receiving the second signal, the servo feed unit 32 can decrease the predetermined length 35 of a next sheet portion 36D. In one embodiment, the second signal from the control system 18 can cause the servo feed unit to decrease the predetermined length by a second amount to alter or adjust the position of subsequent indicia 68 formed on the continuous sheet of material. In one embodiment, the second amount is from approximately 0.005 inches to approximately 0.050 inches.

Signals from the control system 18 can optionally specify a magnitude to increase or decrease the predetermined length 35 based on how far the indicia 68 is from the upstream side 39A or the downstream side 39B of a sheet portion. In one embodiment, if the indicia 68 is up to a first distance 41A from the downstream side 39B, such as indicia 68A of FIG. 7A, the control system 18 can send a third signal to the servo feed unit 32. In one embodiment, the third signal can direct the servo feed unit to increase the predetermined length 35 by a third amount. The third amount, in one embodiment, is from approximately 0.020 inches to approximately 0.050 inches.

In another embodiment, when an indicia is greater than the first distance 41A, but less than a second distance 42A from the downstream side 39B of a sheet portion 36A, such as indicia 68B of FIG. 7A, the control system can send a fourth signal to the servo feed unit. The fourth signal can cause the servo feed unit 32 to increase the predetermined length 35 by a fourth amount. In one embodiment, the fourth amount is from approximately 0.005 inches to approximately 0.020 inches.

If the control system determines an indicia is within a first distance 41B of the upstream side 39A of a sheet portion 36C, such as indicia 68E shown in FIG. 7B, the control system 18 can send a fifth signal to the servo feed unit to decrease the predetermined length by a fifth amount. In one embodiment, the fifth amount is from approximately 0.020 inches to approximately 0.050 inches. Alternatively, when an indicia is between the first distance 41B and a second distance 42B from the upstream side 39A, such as indicia 68F of sheet portion 36C, the control system 18 can send a sixth signal to the servo feed unit 32 to decrease the predetermined length by a sixth amount. In one embodiment, the sixth amount is from approximately 0.005 inches to approximately 0.020 inches.

The control system 18 can send signals to the servo feed unit 32 to adjust (i.e., increase or decrease) the predetermined length 35 after determining one or more indicia are not in a predetermined location within a sheet portion 36. In one embodiment, the control system 18 can send a signal to adjust the predetermined length after determining indicia are not in the predetermined location on a predetermined number of sheet portions 36. In one embodiment, the control system can wait until indicia formed in an incorrect position are observed in a predetermined number of consecutive sheet portions 36. More specifically, in one embodiment the control system 18 can send the signal to adjust the predetermined length after determining indicia are too close to one of the upstream side 39A or the downstream side 39B on at least three consecutive sheet portions 36. In another embodiment, the control system 18 can wait until determining that indicia 68 are not in the predetermined location on five consecutive sheet portions 36.

Additionally, or alternatively, the control system 18 can wait to send the signal until after determining the indicia are formed in an incorrect position in a predetermined number of sheet portions 36 in a sample of sheet portions. In one embodiment, the control system 18 can send the signal to adjust the predetermined length after determining indicia are too close to one of the upstream side 39A or the downstream side 39B on at least three sheet portions 36 in a sample ten sheet portions. In another embodiment, when five sheet portions 36 in a sample of ten sheet portions include indicia that are too close to one of the sides 39A, 39B, the control system can send the signal to adjust the predetermined length. Optionally, the control system can send the signal after determining that at least 50 percent of a sample of a predetermined number of sheet portion 36 have indicia that are formed too close to one of the upstream 39A or the downstream side 39B. In one embodiment, an operator can use an input device 116 associated with the control system 18 to enter the predetermined number or percent of sheet portions that should be observed with indicia to close to either the upstream side 39A or the downstream side 39B before the control system can send a signal to adjust the length In one embodiment, after sending a signal to adjust the predetermined length, the control system 18 can wait a predetermined number of cycles of the apparatus 8 before sending another signal to adjust the predetermined length. In one embodiment, the control system can wait for between 30 cycles and 80 cycles before sending another signal to the servo feed unit 32 to adjust the predetermined length of the continuous sheet of material fed into the operation zone. In another embodiment, the control system can wait for up to 55 cycles after sending one of the first through sixth signals before sending another signal to adjust the predetermined length. Alternatively, after sending a signal to adjust the predetermined length, the control system can wait for between two cycles and fifty-five cycles before sending another signal to adjust the predetermined length.

Figure 8:
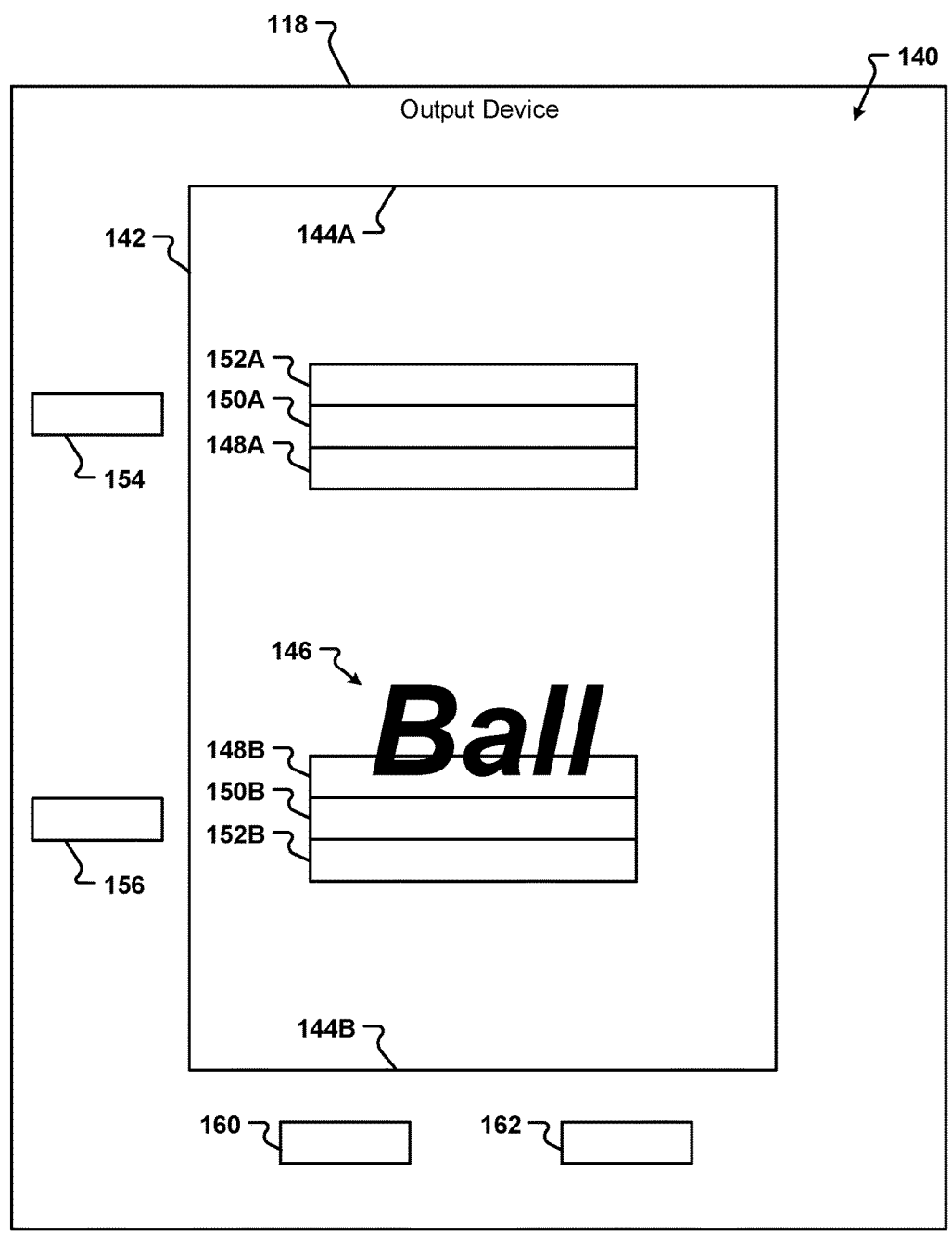
FIG. 8 is a schematic view of a user interface generated by a control system according to one embodiment of the present invention.

Referring now to FIG. 8, in one embodiment of the present invention, the control system 18 can generate a user interface 140 indicating a position of an indicia 68 on a sheet portion 36. The user interface 140 can be displayed on an output device 118 of the control system 18. In one embodiment, the user interface 140 can include a representation 142 of a sheet portion which can subsequently be formed into a tab for an end closure. An image 146 of the indicia 68 in a position detected by the camera 58 can be displayed on the representation 142. The user interface 140 can optionally include one or more boxes 148, 150, 152 proximate to an upstream side 144A and a downstream side 144B of the representation 142. The boxes 148A, 150A, 152A, 148B, 150B, and 152B indicate predetermined distances from the upstream side 144A and the downstream side 144B of the representation 142 of the sheet portion, respectively. Optionally, the boxes 148, 150, 152 have the same height. In another embodiment, the boxes 148, 150, 152 can have different heights to indicate different distances from the sides 144A, 144B. Although three boxes 148, 150, 152 are shown proximate to the upstream side 144A and the downstream side 144B, one of skill in the art will appreciate that the user interface 140 can include more, or fewer, boxes. In one embodiment, the user interface 140 can include from one to six boxes proximate to one or more of the upstream 144A and downstream 144B sides of the sheet portion representation 142.

In one embodiment, the boxes 148, 150, 152 can indicate a magnitude of the error of the position of the indicia pictured by the camera 58. For example, the image 146 of the indicia shown in FIG. 8 is too close to the downstream side 144B of the sheet portion symbolized by representation 142. The image 146 is shown partially within an inner box 148B. Accordingly, the control system 18 can send a signal to the servo feed unit 32 to increase the predetermined length of the continuous sheet of material in the next cycle of the apparatus 8. However, because the box 148B is the furthest of the downstream boxes 148B, 150B, 152B from the downstream side 144B, the control system 18 can send a signal directing only a minor increase in the predetermined length. For example, in one embodiment the inner box 148B is associated with the fourth signal and the control system 18 can direct the servo feed unit 32 to increase the predetermined length by from approximately 0.005 inches to approximately 0.020 inches. If the image 146 is within a median box 150A, 150B, the control system 18 can send a signal directing a medium increase or decrease of the predetermined length, respectively. Similarly, when the control system 18 determined the image 146 is within an outer box 152A, 152B, the control system can send a signal directing an increase or decrease in the predetermined length that is greater than when the image 146 is in one of boxes 148, 150.

Additionally, or alternatively, an operator of the system 2 can adjust one or more of the cycle time (or the intake time) and the intake length 35 of the continuous sheet of material 4 by a user interface or input device 116 of the control system 18. In one embodiment, the user interface 140 can include an icon 154 that can be selected by a user to increase the predetermine length 35. Another icon 156 can be selected by a user to decrease the predetermined length 35. Optionally, the user interface 140 also can include icons 160, 162 that can be selected to increase or decrease the cycle time of the apparatus 8. In another embodiment, the control system 18 can automatically send a signal to the servo feed unit 32 to adjust the cycle time. Accordingly, the control system 18 can advance the continuous sheet of material 4 automatically, or in response to operator input, to perform the operation, such as forming a mark or indicia 68 with a laser, on a predetermined portion of the continuous sheet of material 4. In this manner, the mark 68 is properly positioned on a tab 60 subsequently formed from the continuous sheet by the conversion press 10.

While the continuous sheet of material is moved into the operation zone 50, the stabilizing roller 34 of the apparatus 8 can stabilize the continuous sheet of material 4. In one embodiment, the apparatus 8 can include a plurality of stabilizing rollers 34 in a variety of locations before and after the units 38, 40.

After the predetermined length 35 of continuous sheet of material 4 has been positioned in the operation zone 50, the servo feed unit 32 stops while the units 38, 40 perform the operation on the continuous sheet of material. For example, in one embodiment, the units 38, 40 are laser units that form marks or indicia 68 on the continuous sheet of material. Alternatively, any type of operation besides a laser could be used to mark, print, form, cut, shape, or alter the continuous sheet material. Optionally, a hold fixture (not illustrated) of the apparatus 8 can engage the continuous sheet of material 4 when the servo feed unit stops to prevent unintended or inadvertent movement during operations performed by the units 38, 40.

As the continuous sheet of material 4 is substantially stationary in the operation zone 50 during the operations performed by one or more of the units 38, 40, the uncoiler 6 can continue to uncoil the continuous sheet of material 4, increasing the amount of the continuous sheet of material in the infeed accumulation device 28. Likewise, the downstream equipment 10 can continue to draw in the continuous sheet of material 4 at a predetermined speed, thereby decreasing the amount of the continuous sheet of material in the outfeed accumulation device 44 as will be described in more detail hereinafter in conjunction with FIGS. 5A-5C.

Figure 3:
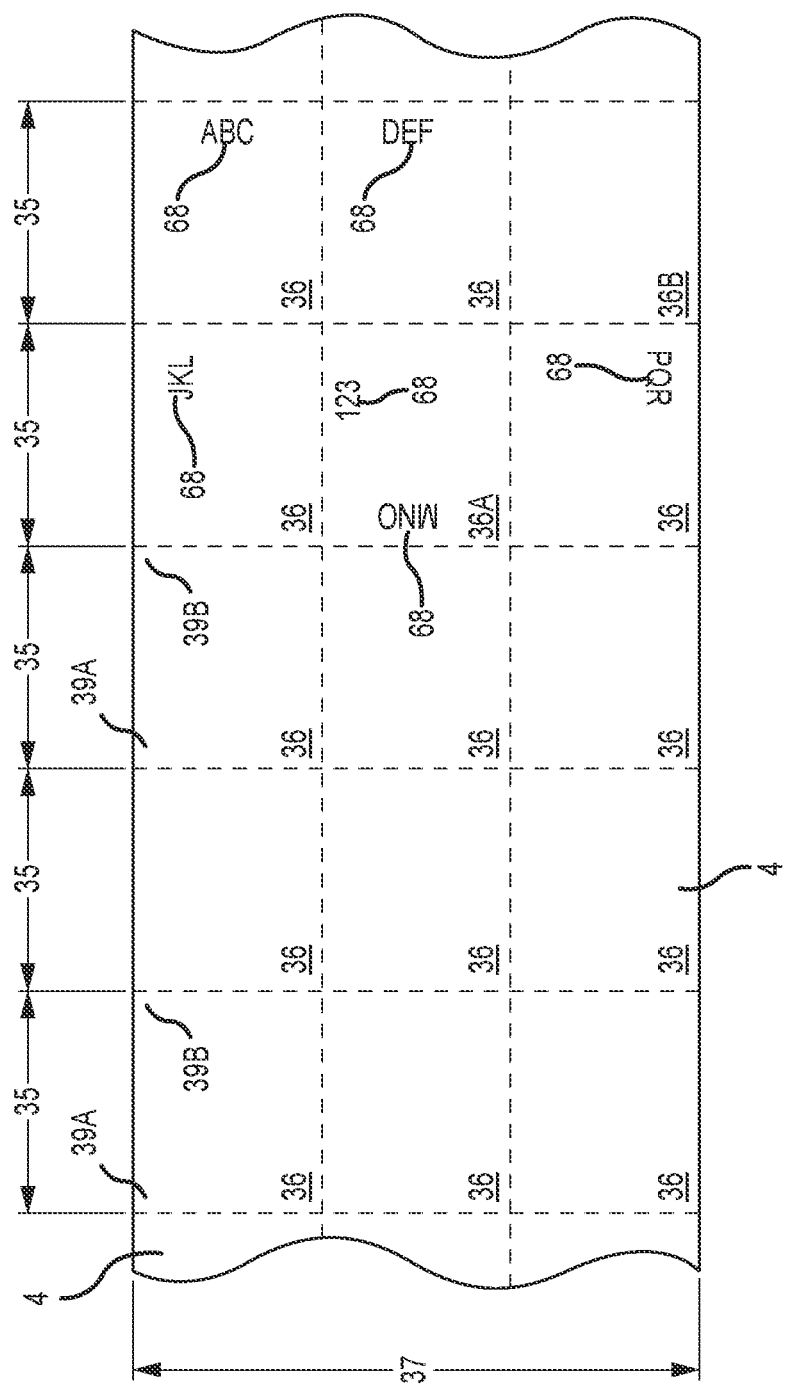
FIG. 3 is a partial top plan view of a portion of a continuous sheet of material that is partially-marked according to an embodiment of the present invention.

Referring now to FIG. 3, in one embodiment, the units 38, 40 comprise lasers that mark predetermined portions 36 of a continuous sheet of tab stock 4 that can subsequently be formed into tabs 60 by the conversion press 10. The markings 68 can be in any orientation and any location within each portion 36 of the tab stock 4. Additionally, each portion 36 can have more than one marking 68 with each marking having a different orientation, as illustrated by portion 36A. Optionally, at least one portion 36B within each length 35 of tab stock 4 can be left unmarked. In one embodiment, the markings have a height of up to approximately 0.125 inches. The tab stock 4 has a width 37 sufficient for the conversion press 10 to form a number of tabs 60 from each predetermined length 35 of the tab stock 4. In one embodiment, the tab stock 4 has a width 37 sufficient for three portions 36 within each length 35 that can subsequently be formed into three tabs 60. However, one of skill in the art will appreciate that the width of the tab stock 4 can be increased or decreased to a width sufficient for the conversion press 10 to form more or fewer tabs 60 from each predetermined length 35 of the tab stock 4.

The units 38, 40 can perform operations on either or both sides of the continuous sheet of material 4 substantially simultaneously. Accordingly, in an embodiment in which the continuous sheet comprises tab stock material, when the conversion press 10 forms the continuous sheet of material 4 into tabs 60, the upper (or external) surface of the tab 60 visible to the consumer and the lower surface of the tab 60 (which is not initially visible to the consumer) can both include one or more markings 68. Markings on the lower surface of the tab 60 can be visible to the consumer after a grasping portion 64 of the tab 60 is lifted to sever a score 78 and depress a tear panel 80 of the end closure 74 to open a pour opening 82.

Referring again to FIG. 1, the apparatus 8 can include any number of units 38, 40. For example, the apparatus can include any number of units 38 arranged to perform an operation on a first side of the continuous sheet of material 4. Additionally or alternatively, the apparatus can also include any number of units 40 to perform an operation on a second side of the continuous sheet of material. The number and positions of the tooling or lasers of unit 38 can be the same as, or different from, the number and positions of the tooling or lasers of unit 40. In one embodiment, the apparatus 8 can include from one to four laser units 38 to mark the first side of the continuous sheet of material. Additionally, or alternatively, the apparatus can include from one to four laser units 40 to mark the second side of the continuous sheet of material substantially simultaneously with the first side. In one embodiment, the laser units 38, 40 are operable to mark the continuous sheet of material 4 in less than approximately 60 milliseconds, and more preferably, in less than about 50 milliseconds. Optionally, in one embodiment, the continuous sheet of material 4 can be advanced one or more times for marking by one or more laser units 38, 40 to complete each marking, or to form more complex markings.

In one embodiment, the laser units 38 can be substantially the same as, or different from, the laser units 40. In another embodiment, the laser units 38, 40 include one or more Nd:YAG lasers (also known as neodymium-doped yttrium aluminum garnet lasers) with a wavelength of approximately 1.064 In yet another embodiment, the laser units 38, 40 provide an output from about 40 Watts to about 140 Watts of applied power, with about 80% of such power being delivered to a target area of the continuous sheet of material 4. In still another embodiment, the laser units 38, 40 provide a pulsed or intermittent form of laser light. In one embodiment, the laser units 38, 40 can provide pulses at from approximately 3,000 Hz to approximately 65,000 Hz. Preferably the output laser light pulses are relatively stable in the sense that there is relatively little variation in power from one pulse to the next and substantially all pulses have sufficient power to vaporize or ablate the material of the target area of the continuous sheet of material 4 sufficiently to produce a visible spot or mark. In still another embodiment, the laser units 38, 40 are operable to mark approximately 1,300 characters per second and approximately 50 feet of continuous sheet material per second. In one embodiment, the laser units 40 can be of a different type, or operate at a different power level, then the laser units 38. Laser units 38, 40 that can be used in this regard are known by those of skill in the art and are available from a variety of suppliers.

The apparatus 8 can optionally include a cooling system 52 to maintain the units 38, 40 at a predetermined temperature. Suitable cooling systems 52 are known to those of skill in the art and can use a variety of methods to maintain the predetermined temperature of the units 38, 40. In one embodiment, the cooling system 52 is external to the apparatus 8 and the apparatus 8 can include one or more cooling ports for integration with the external cooling system 52.

After the operations are completed by the units 38, 40 or other device, the continuous sheet of material 4 optionally passes through a dust control system 20. The dust control system 20 removes debris from the continuous sheet of material 4 by any suitable method. In one embodiment, the dust control system 20 uses one or more of a stream of a gas, a stream of a liquid, suction, and brushes that contact either or both surfaces of the continuous sheet of material 4 to clean away debris. The dust control system 20 can be positioned before or after the servo feed unit 32. The apparatus 8 can include a number of ports or apertures to interconnect the dust control system 20. Any dust control system 20 known to those of skill in the art may be used with the system 2 of the present invention.

Optionally, after the units 38, 40 perform their operations, one or both sides of the continuous sheet of material 4 can receive a coating of a lubricant from a lubrication system (not illustrated). In one embodiment, the lubrication system is interconnected to the conversion press 10. In another embodiment, the lubrication system is interconnected to the apparatus 8. Suitable lubrication systems operable to provide the lubricate to the strip of continuous sheet of material 4 are known to those of skill in the art and may be obtained from a variety of suppliers such as, but not limited to, UNIST Inc.

After the units 38, 40 perform their operations, the continuous sheet of material 4 accumulates in the outfeed accumulation device 44 until dawn into the conversion press 10. The outfeed accumulation device 44 is similar to a balancer in a production process as will be recognized by one of skill in the art. The outfeed accumulation device 44 can have the same or different dimensions than the infeed accumulation device 28. In one embodiment, the outfeed accumulation device 44 is up to about 18 inches wide, up to about 24 inches long, and has a height of up to about 75 inches. In another embodiment, the outfeed accumulation device 44 is about 13 inches wide, about 18 inches long, and the height is about 75 inches. In a more preferred embodiment, the width is about 12 inches, the length is about 16 inches, and the height is about 50 inches.

The one or more sensors 46, 47 of the outfeed accumulation device 44 can be the same as, similar to, or different from, the sensors 30, 31. In one embodiment, the sensors 46, 47 can be arranged in substantially the same positions as sensors 30, 31. Further, in embodiments, the sensors 46, 47 can include, or be associated, with a laser. The laser can be positioned with a predetermined alignment to the continuous sheet of material 4. Accordingly, the sensors 46, 47 can be positioned to receive laser energy reflected from a predetermined portion of the continuous sheet of material 4 to determine the amount of the continuous sheet of material 4 in the outfeed accumulation device 44. Additionally, or alternatively, one or more of the sensors 46, 47 can be a camera.

The outfeed loop sensor 46 measures a distance from the sensor 46 to at least one predetermined portion 5, 7 of the continuous sheet of material 4 in the outfeed accumulation device 44. In one embodiment, the sensor 46 measures the distance to a lowermost portion 5 of the continuous sheet of material 4 in outfeed accumulation device 44. In one embodiment, the lowermost portion 5 comprises a trough of the continuous sheet of material in the outfeed accumulation device 44. In another embodiment, the sensor 46 measures a distance between the sensor and a transition point 7 from a generally linear portion of the continuous sheet of material to the trough. In one embodiment, the sensor 46 is positioned to sense an interior portion of a concavity formed by the continuous sheet of material as generally illustrated in FIG. 1. However, it will be appreciated that the sensor 46 can be arranged differently. For example, in another embodiment, the sensor 46 is positioned to sense an exterior portion of the concavity formed by the continuous sheet of material. Accordingly, although the sensor 46 is illustrated in FIG. 1 positioned above the lowermost portion 5 of the continuous sheet of material, the sensor 46 can optionally be positioned below the lowermost portion 5 or in any other position which allows the length of the continuous sheet of material 4 to be measured within the outfeed accumulation device 44. Accordingly, in one embodiment, the sensor 46 senses a first side of the continuous sheet of material. In another embodiment, the sensor 46 senses a second side of the continuous sheet of material 4.

Alternatively, one or more sensors 47A, 47B can be arranged to monitor the position of the continuous sheet of material 4 in the outfeed accumulation device 44. The sensor 47A provides a first signal to the control system 18 when the sensor 47A detects the continuous sheet of material. Continuing this example, when the sensor 47A does not detect the continuous sheet, the sensor 47A provides a second signal to the control system 18. Similarly, the sensor 47B in a different portion of the outfeed accumulation device 44 also provides a first signal when the continuous sheet of material is detected and a different second signal when the continuous sheet of material is not detected.

The control system 18 can determine the length of the continuous sheet of material 4 in outfeed accumulation device 44 from the information received from one or more of the sensors 46, 47. The control system 18 monitors the length of the marked continuous sheet of material 4 in the outfeed accumulation device 44 to ensure a sufficient, uninterrupted flow of the continuous sheet of material into the conversion press 10. The control system 18 can accumulate the continuous sheet of material 4 in outfeed accumulation device 44 to ensure the conversion press 10 is supplied with the continuous sheet of material by increasing or decreasing the cycle time of the apparatus 8. In this manner, the conversion press 10 can draw in the continuous sheet of material 4 from the outfeed accumulation device 44 as required without stressing or stretching the continuous sheet of material.

The control system 18 can increase or decrease the cycle time of the system 2 to ensure a sufficient length of the continuous sheet of material 4 is maintained in the outfeed accumulation device 44 to enable the conversion press 10 to operate without slowing down. In one embodiment, the maximum allowable cycle time for the system 2 to perform a selected operation and advance the continuous sheet of material 4 is approximately 80 milliseconds for a conversion press 10 operating at 750 cycles per minute. This allows approximately 30 milliseconds for the servo feed unit 32 to move the continuous sheet of material 4 into the operation zone 50 and approximately 50 milliseconds for the units 38, 40 to perform an operation on the continuous sheet of material 4. Optionally, in one embodiment, the servo feed unit can move the continuous sheet of material into the operation zone is less than about 25 milliseconds such that the units 38, 40 have approximately 55 milliseconds to perform the operation on the continuous sheet of material. In one embodiment, the system 2 can operate at up to approximately 800 cycles per minute.

The control system 18 can also receive a variety of signals from the encoder 22 associated with the conversion press 10. The signals from the encoder 22 can indicate that the conversion press 10 is operating, is ready, and/or is not operational. The signals can also include the cycle rate (or operating speed) of the conversion press and a desired location for the operation to be performed on the continuous sheet of material 4. The control system 18 can use the signals received from the encoder 22 to change the cycle rate of the apparatus 8 and the length 35 of the continuous sheet of material 4 moved into the operation zone 50 during each cycle of the apparatus 8.

Figure 4A:
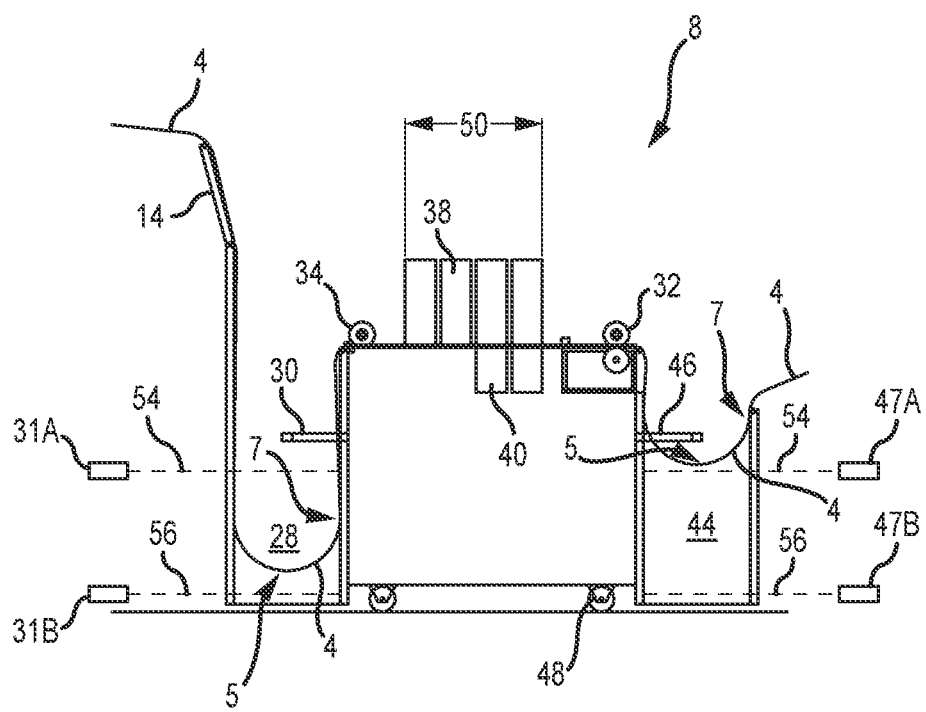
FIG. 4A is a side elevation view of one embodiment of an apparatus of the present invention illustrating an insufficient length of a continuous sheet of material in an outfeed accumulation device of the apparatus.

Referring now to FIG. 4A, when the continuous sheet of material 4 in the outfeed accumulation device 44 is above a predetermined position, for example, upper position 54, the height of the continuous sheet of material is too high and there is an insufficient length of the continuous sheet of material in the outfeed accumulation device 44. In response, the control system 18 can send a signal to the servo feed unit 32 and the units 38, 40 to increase the cycle rate of the apparatus 8 to be faster than the intake rate of the conversion press 10. In this manner, the length of the continuous sheet of material in the outfeed accumulation device 44 is increased. Increasing the cycle rate of the apparatus 8 can decrease the amount of time available for the units 38, 40 to perform their operations on the continuous sheet of material 4. In one embodiment, the control system 18 can send a signal to the servo feed unit 32 to increase the input speed of the continuous sheet of material to reduce the time required move the continuous sheet of material into the marking zone 50 to less than about 30 milliseconds. Accordingly, the cycle rate of the apparatus 8 can be increased without deceasing the time available for the operation performed by the units 38, 40. In this manner, when the operation is a laser mark 68 formed on the continuous sheet of material, the cycle rate of the apparatus can be increased without decreasing the time available for marking by the laser units 38, 40 and without decreasing the quality of the marking applied to the continuous sheet of material 4. Alternatively, in another embodiment, the control system 18 can send a signal to temporarily increase the power used by the laser units 38, 40 to make the mark 68 to decrease the marking time. The control system can also send a signal to the apparatus 8 to decrease the quality or size of markings 68 formed by the laser units 38, 40. In this manner, the markings can be formed in less time to temporarily increase the cycle rate of the apparatus 8. Optionally, in one embodiment, the control system 18 can send a signal to change the intake rate, or to stop the intake, of the continuous sheet of material 4 by the conversion press 10.

Figure 4B:
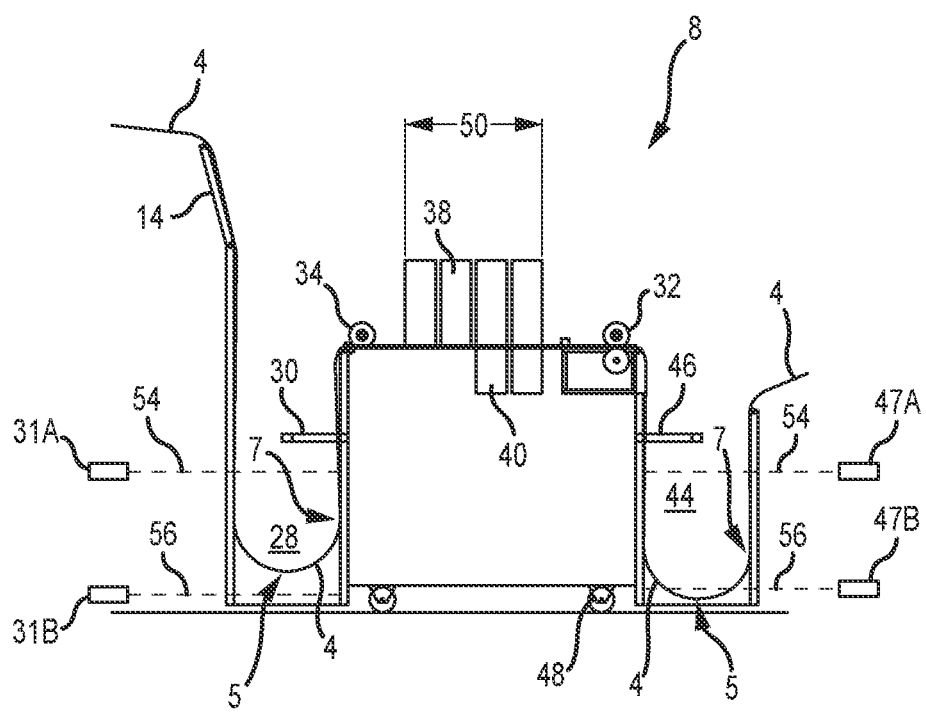
FIG. 4B is a side elevation view of the apparatus of FIG. 4A illustrating an excessive length of the continuous sheet of material in the outfeed accumulation device of the apparatus.

Referring now to FIG. 4B, when the continuous sheet of material 4 in the outfeed accumulation device 44 is below a predetermined position, as generally illustrated by lower position 56, the distance from the sensor 46 to one or more of the predetermined portions 5 or 7 of the continuous sheet of material 4 is too great. Optionally, the sensor 47B can send the first signal after detecting the continuous sheet of material 4 in the position illustrated in FIG. 4B. In response, the control system 18 can determine that there is too much of the continuous sheet of material in outfeed accumulation device 44. The control system 18 can send a signal to the servo feed unit 32 and the units 38, 40 to decrease the cycle rate of the apparatus 8 to be slower than the intake rate of the conversion press 10. Decreasing the cycle rate of the apparatus 8 can decrease the length of the continuous sheet of material 4 in the outfeed accumulation device 44. Optionally, when the cycle rate of the apparatus is decreased, the servo feed unit 32 moves the continuous sheet of material 4 into the marking zone 50 at the same rate but the laser units 38, 40 operate at a lower power level. In this manner, the laser units take more time to form marks 68 on the continuous sheet of material 4, but forming the marks requires less energy. Optionally, in an embodiment, the power level of the laser units 38, 40 can be adjusted by between 0% and 100%.

It will be appreciated by one of skill in the art that the positions 54 and 56 can be varied (set lower or higher) by a user. Further, the positions 54, 56 can be set at different heights in each of the infeed and outfeed devices 28, 44. In one embodiment, the sensors 31A, 47A can generally be aligned with the upper positions 54 in the infeed and outfeed devices 28, 44. Similarly, in another embodiment, then sensors 31B, 47B can generally be aligned with the lower positions 56 in the infeed and outfeed devices 28, 44.

Figure 5A:
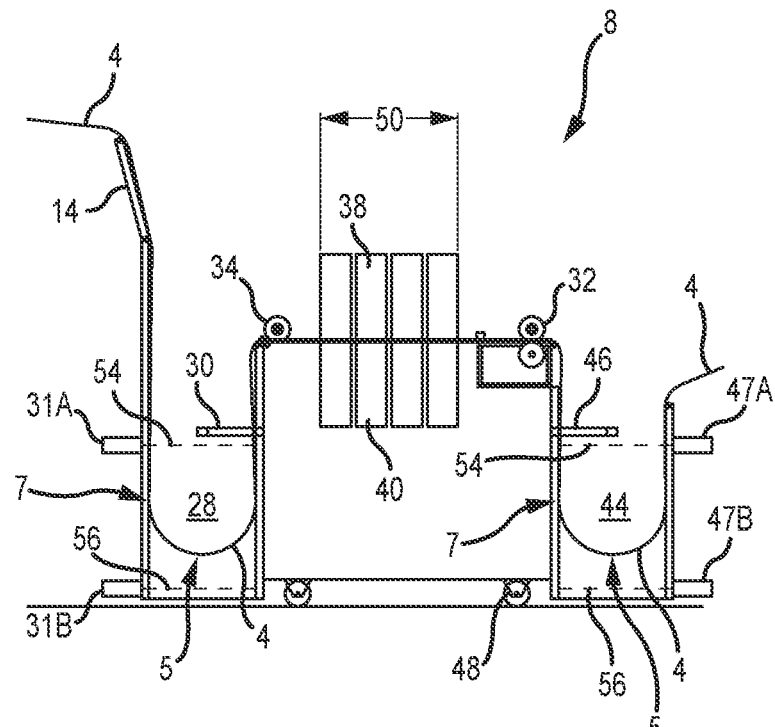
FIG. 5A is a side elevation view of an apparatus of the present invention illustrating a first position of the continuous sheet of material in an infeed accumulation device and an outfeed accumulation device during a cycle of the apparatus.
Figure 5B:
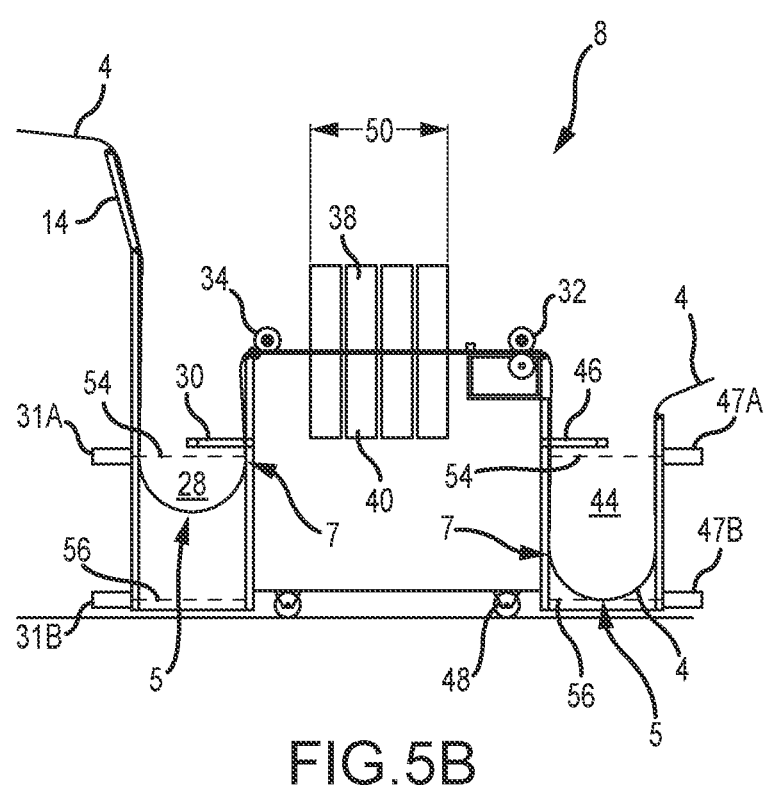
FIG. 5B is a side elevation view of the apparatus of FIG. 5A illustrating a second position of the continuous sheet of material in the infeed and outfeed accumulation devices during the cycle of the apparatus.
Figure 5C:
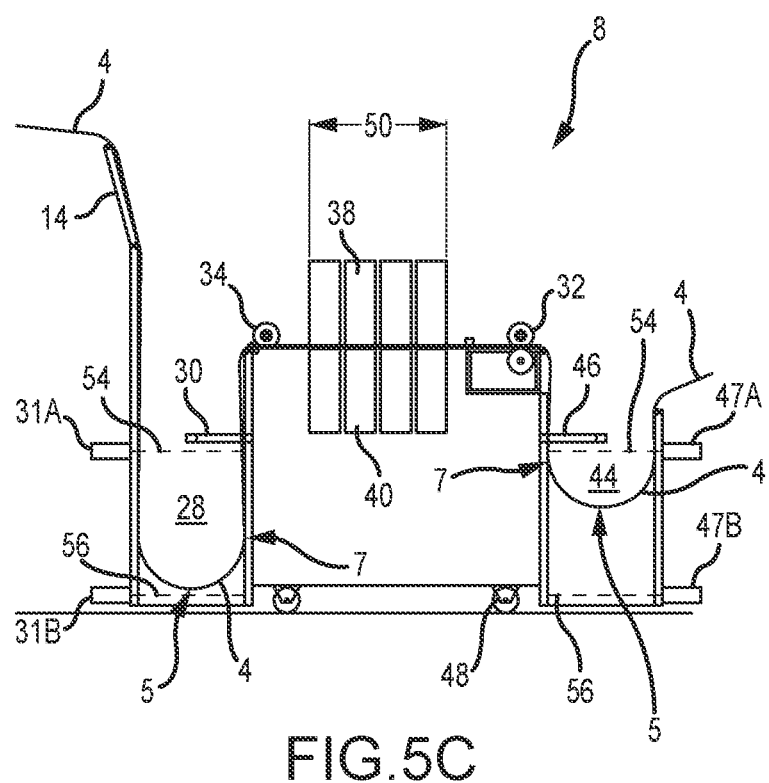
FIG. 5C is a side elevation view of the apparatus of FIG. 5A illustrating a third position of the continuous sheet of material in the infeed and outfeed accumulation devices during the cycle of the apparatus.

Referring now to FIGS. 5A-5C, the movement of the continuous sheet of material 4 through the infeed and outfeed accumulation devices 28, 44 during a cycle of the apparatus 8 are generally illustrated. An initial position of the continuous sheet of material 4 is illustrated in the infeed and outfeed accumulation devices 28, 44 in FIG. 5A. The continuous sheet of material is between the upper position 54 and the lower position 56. Accordingly, there is a sufficient length of the continuous sheet of material in devices 28, 44.

Referring now to FIG. 5B, after the servo feed unit 32 moves the predetermined length 35 of the continuous sheet of material 4 into the operation zone 50, the length of the continuous sheet of material in the infeed accumulation device 28 may temporarily decrease. The length of the continuous sheet of material in the outfeed accumulation device 44 may temporarily increase. However, as illustrated in FIG. 5B, the control system 18 is operable to control the input rate of the servo feed unit 32 such that the length of the continuous sheet of material in the outfeed accumulation device 44 is not too long by preventing the continuous sheet of material 4 from crossing below the lower position 56.

Referring now to FIG. 5C, as previously mentioned, during the operation performed by the units 38, 40, the continuous sheet of material 4 is maintained substantially stationary in the operation zone 50 by the stabilizing roller 34. However, the conversion press 10 continues to draw in the continuous sheet of material 4 at a predetermined rate. Accordingly, the length of the continuous sheet of material in the outfeed accumulation device 44 may decrease as the units 38, 40 perform their operations on the continuous sheet of material 4. The length of the continuous sheet of material 4 in the infeed accumulation device 28 may increase as the uncoiler 6 continues to uncoil the unmarked continuous sheet of material. In one embodiment, the control system 18 can send a signal to stop the uncoiler 6 while the units 38, 40 perform operations on the continuous sheet of material 4. In this manner, the length of the continuous sheet of material in the infeed accumulation device 28 can remain substantially constant. After the units 38, 40 finish their operations on the continuous sheet of material 4, the control system 18 sends a signal to the servo feed unit 32 to move another predetermined length 35 of the continuous sheet of material into position in the operation zone 50. The lengths of the continuous sheet of material in devices 28, 44 can then be substantially as illustrated in either FIG. 5A or FIG. 5B.

Referring again to FIG. 1, the apparatus 8 optionally includes an alignment system 48 to facilitate installation and removal of the apparatus 8 between the uncoiler 6 and the conversion press 10 as necessary. The alignment system 48 can include cart stops (not illustrated) that interconnect to connectors located at predetermined positions in the production facility. Alternatively, the connectors can be positioned on the conversion press 10 or on a loop stand associated with the conversion press 10. The alignment system 48 enables the apparatus 8 to be integrated with the conversion press efficiently with a minimum of down time. When the downstream equipment 10 does not require the operation performed by the units 38, 40 of the apparatus 8, the apparatus can be quickly removed from the system 2. For example, in one embodiment, if a batch of end closures 74 does not require marking 68 on the tabs 60, the apparatus 8 can be quickly removed by releasing the cart stops of the alignment system 48. Optionally, when a batch of end closures 74 does not require marked tabs 60, the apparatus 8 can be left in position with the laser units 38, 40 and the servo feed unit 32 turned off or in a neutral position. The continuous sheet of material 4 can then freely pass through the apparatus 8 at a rate equal to the intake rate of the conversion press 10.

The conversion press 10 draws in the marked continuous sheet of material as needed from the outfeed accumulation device 44. The conversion press 10 can include tools operable to form the continuous sheet of material 4 received from the system 2 into a tab 60 of any predetermined size or shape. The tab 60 generally includes a forward edge 62 and a grasping portion 64. Optionally, the conversion press 10 can form an aperture 66 in the grasping portion 64 of the tab 60. However, as will be appreciated by one of skill in the art, the conversion press 10 can optionally form the tab 60 with a closed web in the grasping portion 64 to provide a larger structure on the tab 60 for marking and grasping by a consumer.

A plurality of marks 68 can be positioned in any predetermined portion of the tab 60 in any orientation. It will be appreciated that marks 68 can be formed at any location on the tab 60, including the lower surface (not illustrated) of the tab 60 facing the exterior surface of the end closure 74. Further, the marks 68 can include any combination of text, numerals, customer identification information, branding information, directions of use, sweepstakes tokens, images, or any other desired decoration or indicia of any size.

The conversion press 10 also receives end closure shells (not illustrated) from a balancer 70. The balancer 70, in one embodiment, is a mechanical sponge that controls the flow of the end closure shells to the conversion press 10 from other upstream equipment 72, such as a shell press, used in the end closure manufacturing process. The balancer 70 maintains the proper speed and flow of the end closure shells to ensure a consistent, non-interrupted flow of end closure shells into the conversion press 10. The balancer 70 can accumulate end closure shells to ensure the conversion press 10 is supplied with end closure shells if the upstream equipment 72 goes offline, for example, for maintenance, during unscheduled stops, or when a new coil of sheet metal used to form the end closure shells is loaded in an uncoiler (not illustrated).

The conversion press 10 contains multiple progressive die sets which raise a rivet 76 in the end closure 74. Although the rivet 76 is illustrated in FIG. 1 substantially centered on the end closure 74, one of skill in the art will recognize that the rivet 76 can be located at any predetermined location of the end closure 74. In one embodiment, the rivet 76 is not centered on the end closure 74. The conversion press 10 can also include tools to form severable scores 78 to define a tear panel 80 that can be opened to create a pour opening 82. After forming the end closure 74, the conversion press 10 interconnects the tab 60 to the rivet 76.

The completed end closures 74 can then be sent to a bagger 86. The bagger 86 counts and inserts a predetermined number of the end closures 74 into packages such as sacks or bags made of any desired material including paper, plastic, or cardboard.

Figure 9:
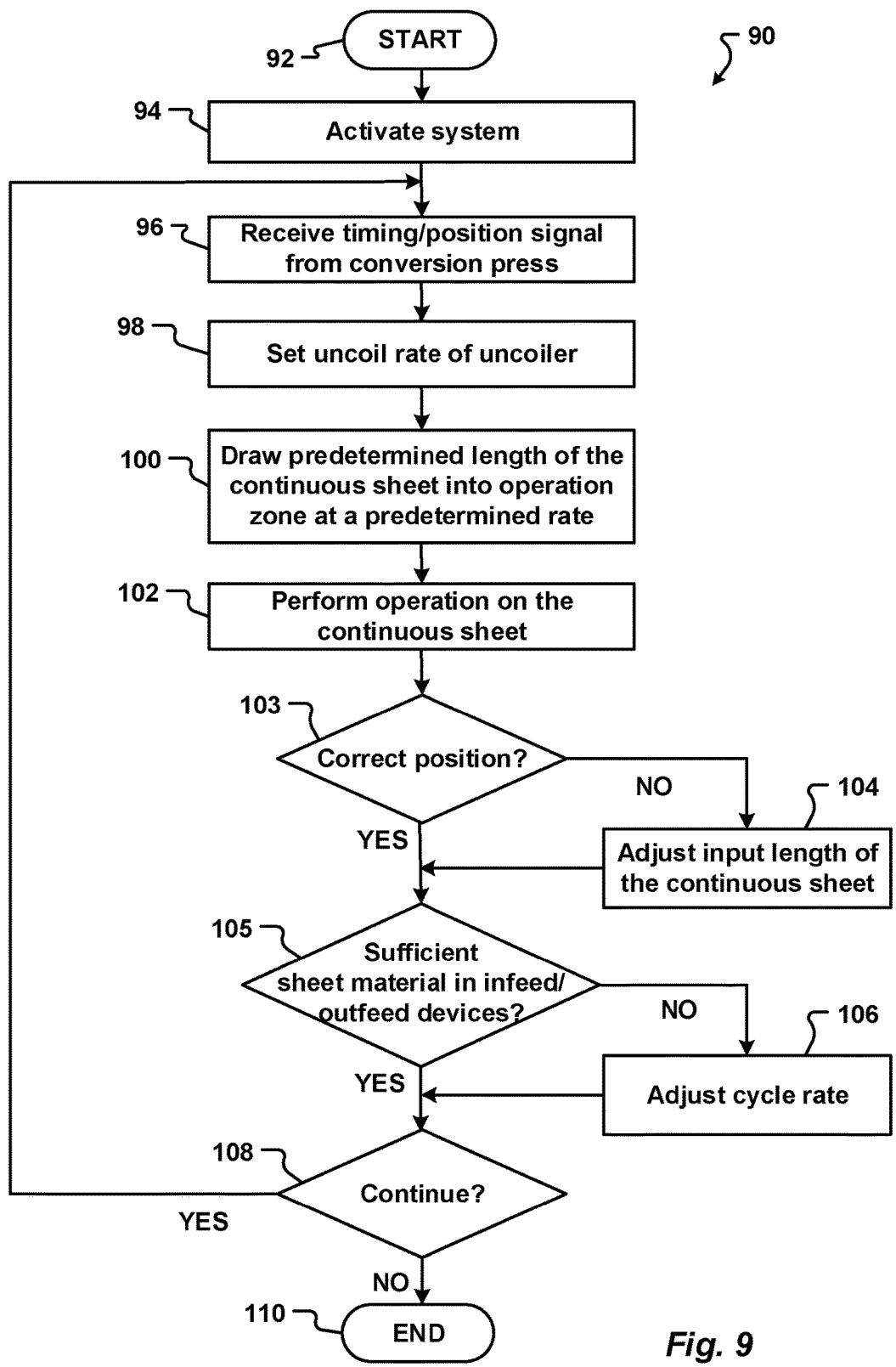
FIG. 9 is a process diagram of a method of performing an operation on a continuous sheet of material according to one embodiment of the present invention.

Referring now to FIG. 9, an embodiment of a method 90 for performing an operation on a continuous sheet of material 4 is generally illustrated. In one embodiment, the continuous sheet is subsequently formed into tabs 60 that can be interconnected to container end closures 74. While a general order of the method 90 is shown in FIG. 9, it will be understood by one of skill in the art that the method 90 can include more or fewer operations and can arrange the order of the operations differently than those shown in FIG. 9. Although the operations of the method may be described sequentially, many of the operations can in fact be performed in parallel or concurrently. Generally, the method 90 starts with a start operation 92 and ends with an end operation 110. The method 90 can be executed as a set of computer-executable instructions executed by a computer system and encoded or stored on a computer readable medium. One example of the computer system can include, for example, the control system 18 which is generally illustrated and described in conjunction with FIG. 6. An example of the computer readable medium can include, but is not limited to, a memory 120, 126 of the control system 18. Hereinafter, the method 90 shall be explained with reference to the system 2 and components described in conjunction with FIGS. 1-8.

At operation 94, the system 2 is activated. This generally can include, but is not limited to, the control system 18: (1) activating at least one of the units 38, 40; (2) activating the dust control system 20; (3) determining that the servo feed unit 32 is ready; (4) determining that a sufficient length of the continuous sheet of material is in each of the infeed and outfeed accumulation devices 28, 44 using information received from one or more of the loop sensors 30, 31, 46, 47; (5) determining that the lubricator is ready; and (6) determining that the uncoiler 6 is ready. In one embodiment, activating the units 38, 40 further comprises ensuring lasers of the units 38, 40 are at an operational temperature and/or are properly aligned.

At operation 96, the control system 18 receives information from the encoder 22 associated with a conversion press 10. The information can include, but is not limited to, the cycle rate of the conversion press 10 and a desired position for the operation that will be performed on the continuous sheet of material 4. For example, in one embodiment, the information from the encoder 22 can be used by the control system 18 to position a mark 68 formed by a laser in a predetermined position of the continuous sheet of material. The control system 18 can use the information from the encoder 22 to determine a position for the marks 68 on each portion 36 of the continuous sheet of material. At operation 98, the control system 18 sends a signal to the uncoiler 6 to control the rate at which the continuous sheet of material 4 is uncoiled from the coil 26 of the continuous sheet.

The control system 18 sends a signal, at operation 100, directing the servo feed unit 32 to move a predetermined length 35 of the continuous sheet of material into the operation zone 50 at a predetermined rate. In one embodiment, the continuous sheet of material comprises tab stock which can be formed into tabs for end closures.

The control system 18 can change the predetermined rate at which the servo feed unit moves the predetermined length 35 into the operation zone. More specifically, the control system can send a signal to the servo feed unit 32 to increase, or decrease, the rate at which the servo feed unit moves the continuous sheet of material into the operation zone. In one embodiment, the control system 18 can adjust the predetermined rate of the servo feed unit 32 up to each cycle.

The units 38, 40 perform a predetermined operation on the continuous sheet of material 4 at operation 102. In one embodiment, this comprises lasers of units 38, 40 forming a mark 68 on the continuous sheet. The control system 18 sends signals to the laser units 38, 40 to control the type and position of the marks 68. The length of time available for the laser units 38, 40 to form the marks is also controlled by a signal received from the control system 18. The system 2 is operable to provide unique marks 68 on a plurality of tabs 60. Accordingly, the control system 18 can send a unique design for each mark 68 to the laser units 38, 40 during each cycle of the system 2.

At operation 103, the control system 18 can determine if the operation has been performed at a correct position on the continuous sheet of material. More specifically, in one embodiment, the control system 18 receives data from a sensor 58, such as a camera. In one embodiment, the data comprises a picture of an indicia 68 formed on a portion 36 of the continuous sheet of material. The control system 18 can determine if the indicia 68 is in a predetermined position of the sheet portion 36. If the control system 18 determines the indicia 68 is in the predetermined position, the method 90 continuous YES to operation 105. Alternatively, if the control system 18 determines the indicia is not in the predetermined position, the method 90 proceeds to operation 104.

At operation 104, the control system 18 can determine an amount to increase or decrease the predetermined length of the continuous sheet of material fed by the servo feed unit 32 into the operation zone. As described in conjunction with FIGS. 7A, 7B, the control system 18 can send signals to the servo feed unit 32 which cause the servo feed unit to adjust (such as by increasing or decreasing) the predetermined length by various amounts based on the magnitude of the error of the position of the indicia. In one embodiment, the control system 18 can wait until a predetermined number of consecutive sheet portions 36 are determined by the control system 18 to have indicia that are not in the predetermined location. For example, in one embodiment, the control system 18 can count to a predetermined number of consecutive indicia that are not in the predetermined location before sending the signal to the servo feed unit to increase or decrease the predetermined length. In one embodiment, the control system 18 can wait until after determining that three consecutive indicia are not in the predetermined location before sending the signal. The method 90 then continues to operation 105.

The control system 18 substantially continuously monitors the length of the continuous sheet of material in the infeed and outfeed devices 28, 44, as described above, by using information received from at least one of the sensors 30, 31, 46, 47. The control system 18 can determine, in operation 105, if there is an insufficient length, a sufficient length, or an excessive length of the continuous sheet of material in the infeed and outfeed accumulation devices 28, 44. In one embodiment, the control system 18 monitors the lengths in the infeed and outfeed devices 28, 44 during each cycle of the system 2.

If the control system 18 determines that the length of the continuous sheet of material is insufficient or excessive in either the infeed or the outfeed device 28 or 44, the method 90 proceeds NO to operation 106. If the control system 18 determines that there is a sufficient length of the continuous sheet of material in devices 22 and 44, the method 90 proceeds YES to operation 108.

In operation 106, the control system 18 can adjust the cycle rate of the system 2 to ensure a sufficient length of the continuous sheet of material 4 in maintained in devices 28, 44. For example, in one embodiment, the control system 18 can increase or decrease the intake rate of the servo feed unit 32. In another embodiment, the control system 18 can send a signal to increase or decrease the time available for the units 38, 40 to perform a predetermined operation. Alternatively, in one embodiment, the control system 18 can send a signal to increase or decrease the power used by the laser units 38, 40. Additionally, the control system 18 can send a signal to the uncoiler 6 to adjust the uncoil rate of the continuous sheet of material 4. Alternatively, the control system 18 can send a signal to the encoder 22 to adjust the intake rate of the continuous sheet of material by the conversion press 10. After the control system 18 adjusts the cycle rate of the system 2, the method continues to operation 108.

At any time the control system 18 can determine if the system 2 should continue performing an operation on the continuous sheet of material 4 at operation 108. If the control system 18 determines the operations should continue, method 90 loops YES back to operation 96. The control system 18 can also determine that the operations should stop, for example but not limited to: when marked tabs are not needed by the conversion press 10; when the conversion press 10 has stopped; when the coil 26 of the continuous sheet of material 4 in the uncoiler 6 needs to be replaced; when any component of the system 2 sends an error or alarm code; or when the continuous sheet of material 4 or the marks made on the continuous sheet of material by the laser units 38, 40 are misaligned. When marked tabs are not needed by the conversion press 10, the system 2 can be removed from the end closure production system. Alternatively, system 2 can remain integrated with the end closure production system and the continuous sheet of material 4 can pass freely through the system 2 without marking by the laser units 38, 40. In addition, an operator of the system 2 can send a command to stop the system 2 for any reason using the user interface of the control system 18. If the control system 18 determines the operations should stop, the method 90 proceeds NO to end 110.

If the control system 18 determines the operations should continue in operation 108, method 90 loops YES back to operation 96. When the method 90 returns to operation 103, the control system can again determine if the operation has been performed at a correct position on the continuous sheet of material. When the control system 18 determines the indicia is not in the predetermined position, the method 90 proceeds to operation 104. In operation 104, the control system 18 can again determine an adjustment to the length of the continuous sheet of material necessary to have the operation performed at the correct position. However, if the control system 18 has previously sent a signal to the servo feed unit 32 to adjust the predetermined length, for example by increasing or decreasing the predetermined length, the servo feed unit 32 can wait a predetermined number of cycles of the method 90 before sending another signal to the servo feed unit 32. In one embodiment, the control system 18 can wait for from 10 cycles to 80 cycles before sending another signal to the servo feed unit 32 to adjust the predetermined length of the continuous sheet of material fed into the operation zone.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. Further, a number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In one embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

What is claimed is:

1. An apparatus for providing indicia in a predetermined location of a continuous sheet of metallic tab stock, comprising:
    an infeed accumulation device operable to receive the continuous sheet of metallic tab stock;
    a servo feed unit operable to move a predetermined length of the continuous sheet of metallic tab stock into a marking area;
    a marking apparatus operable to form an indicia on the continuous sheet of metallic tab stock;
    an outfeed accumulation device operable to receive the continuous sheet of metallic tab stock after the marking apparatus has formed the indicia;
    a camera operable to collect an image of the indicia formed on the continuous sheet of metallic tab stock; and
    a control unit operable to determine if the indicia in the image collected by the camera is in the predetermined location, wherein the control unit is operable to determine a magnitude of an error in a location of the indicia and to send an instruction to the servo feed unit to alter the predetermined length when the indicia is not in the predetermined location, and wherein the continuous sheet of metallic tab stock is subsequently formed into tabs adapted for interconnection to container end closures.

2. The apparatus of claim 1, wherein the marking apparatus is a laser unit adapted to form the indicia.

3. The apparatus of claim 2, wherein the laser unit comprises a first laser unit to form an indicia on a first surface of the continuous sheet of metallic tab stock and a second laser unit to form an indicia on a second surface of the continuous sheet of metallic tab stock.

4. The apparatus of claim 1, wherein the servo feed unit is operable to alter the predetermined length of the continuous sheet of metallic tab stock moved into the marking area to adjust a location of the indicia formed on the continuous sheet of metallic tab stock by the marking apparatus.

5. The apparatus of claim 1, wherein the control unit is operable to send an instruction to the servo feed unit to increase the predetermined length when the indicia in the image is too close to a downstream side of a portion of the continuous sheet of metallic tab stock.

6. The apparatus of claim 5, wherein the control unit is operable to send an instruction to the servo feed unit to decrease the predetermined length when the indicia in the image is too close to an upstream side of the portion of the continuous sheet of metallic tab stock.

7. The apparatus of claim 1, wherein the control unit is operable to send an instruction to the servo feed unit to alter the predetermined length after determining that a predetermined number of indicia are not in the predetermined location.

8. A non-transitory computer readable medium comprising a set of instructions stored thereon which, when executed by a processor of a control unit, cause the processor to adjust components of an apparatus that performs an operation on a continuous sheet of metallic material, by:
    signaling a servo unit to move a predetermined length of the continuous sheet of metallic material into the apparatus;
    receiving an image collected by a camera of an indicia formed on the continuous sheet of metallic material;
    determining if the indicia in the image is in a predetermined location;
    preparing an instruction for the servo unit to alter the predetermined length when the indicia is not in the predetermined location, wherein preparing the instruction includes determining a magnitude of an error in a location of the indicia; and
    sending the instruction to the servo unit to alter the predetermined length when the indicia is not in the predetermined location, wherein the continuous sheet of metallic material is subsequently formed into tabs adapted for interconnection to container end closures.

9. The computer readable medium of claim 8, further comprising:
    monitoring an amount of the continuous sheet of metallic material in an outfeed device; and
    sending an instruction to a marking apparatus to alter a rate at which the indicia is formed to accumulate a predetermined length of the continuous sheet of metallic material in the outfeed device.

10. The computer readable medium of claim 8, wherein the instruction causes the servo unit to increase the predetermined length when the indicia in the image is too close to a downstream side of a portion of the continuous sheet of metallic material.

11. The computer readable medium of claim 8, wherein the instruction causes the servo unit to decrease the predetermined length when the indicia in the image is too close to an upstream side of a portion of the continuous sheet of metallic material.

12. The computer readable medium of claim 8, further comprising counting a predetermined number of indicia that are not in the predetermined location before sending the instruction to the servo unit.

13. The computer readable medium of claim 8, further comprising, after sending the instruction to the servo unit, waiting a predetermined number of cycles of the apparatus before sending a second instruction for the servo unit to alter the predetermined length.

14. The computer readable medium of claim 9, further comprising generating a user interface that indicates a position of the indicia formed on the continuous sheet of metallic material.

15. A method of controlling an apparatus that performs an operation on a continuous sheet of metallic material, comprising:
    accumulating a first length of slack in the continuous sheet of metallic material before the apparatus performs the operation;
    feeding a predetermined length of the continuous sheet of metallic material into the apparatus by a servo feed unit;
    performing the operation on a first portion of the continuous sheet of metallic material by the apparatus, wherein the operation comprises forming an indicia;
    accumulating a second length of slack in the continuous sheet of metallic material after the apparatus performs the operation;
    determining if the apparatus performed the operation at a predetermined location of the first portion of the continuous sheet of metallic material based on a location of the indicia on the first portion of the continuous sheet of metallic material in an image of the indicia collected by a camera; and
    sending a signal by a control unit to the servo feed unit to adjust the predetermined length of the continuous sheet of metallic material fed into the apparatus when the operation was not performed at the predetermined location; and
    adjusting, by the servo unit, the predetermined length of the continuous sheet of metallic material fed into the apparatus such that the apparatus performs the operation at a predetermined location of a second portion of the continuous sheet of metallic material, wherein the continuous sheet of metallic material is subsequently formed into tabs adapted for interconnection to container end closures.

16. The method of claim 15, further comprising increasing the predetermined length of the continuous sheet of metallic material fed into the apparatus when the apparatus performed the operation too close to a downstream side of the first portion of the continuous sheet of metallic material.

17. The method of claim 15, further comprising decreasing the predetermined length of the continuous sheet of metallic material fed into the apparatus when the apparatus performed the operation too close to an upstream side of the first portion of the continuous sheet of metallic material.

18. The method of claim 15, further comprising counting a predetermined number of errors in locations of operations performed by the apparatus before adjusting the predetermined length of the continuous sheet of metallic material fed into the apparatus.

19. The method of claim 15, further comprising, after adjusting the predetermined length, waiting a predetermined number of cycles of the apparatus before adjusting the predetermined length a second time.

20. The method of claim 15, further comprising:
    receiving, by the control unit, the image of the first portion of the continuous sheet of metallic material collected by the camera; and
    determining, by the control unit, a magnitude of an error in a location of the operation when the operation was not performed at the predetermined location.

* * * * *